(12) United States Patent
Seo et al.

(10) Patent No.: US 11,614,774 B2
(45) Date of Patent: Mar. 28, 2023

(54) PORTABLE COMMUNICATION DEVICE HOUSING WITH CURVED CORNERS

(71) Applicant: Samsung Electronics Co., Ltd., Gyeonggi-do (KR)

(72) Inventors: Changyong Seo, Gyeonggi-do (KR); Sunghun Kim, Gyeonggi-do (KR); Yoonsik Kim, Gyeonggi-do (KR); Kwangyoun Lee, Gyeonggi-do (KR); Sungho Cho, Gyeonggi-do (KR); Halim Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/315,479

(22) Filed: May 10, 2021

(65) Prior Publication Data

US 2021/0263557 A1    Aug. 26, 2021

Related U.S. Application Data

(63) Continuation of application No. 16/747,723, filed on Jan. 21, 2020, now Pat. No. 11,003,209.

(30) Foreign Application Priority Data

Feb. 15, 2019    (KR) .................. 10-2019-0017697

(51) Int. Cl.
*G06F 1/16*    (2006.01)
(52) U.S. Cl.
CPC .......... *G06F 1/1616* (2013.01); *G06F 1/1681* (2013.01)

(58) Field of Classification Search
CPC combination set(s) only.
See application file for complete search history.

(56) References Cited

U.S. PATENT DOCUMENTS 8,638,546 B2    1/2014 Hoshino
9,470,404 B2    10/2016 Lee et al.
(Continued)

FOREIGN PATENT DOCUMENTS

CN    103294113 A    9/2013
JP    2011-119831 A    6/2011
(Continued)

OTHER PUBLICATIONS

European Search Report dated Oct. 28, 2021.
(Continued)

*Primary Examiner* — Lisa Lea-Edmonds
(74) *Attorney, Agent, or Firm* — Cha & Reiter, LLC

(57) ABSTRACT

According to an embodiment, an electronic device may include a foldable housing including a hinge module; a first housing connected to the hinge module and including a first surface, a second surface, and a first side member; and a second housing. The first side member includes a first side surface, and a second side surface. The second side surface including a first ending portion of the second side surface adjacent to the first side surface forms at least part of a first curved corner having a first radius, and that a second ending portion of the second side surface adjacent to the hinge module forms at least part of a second curved corner having a second radius smaller than the first radius. Periphery portions of the second side surface are substantially non-orthogonally angled with respect to a periphery portion of the second surface.

10 Claims, 21 Drawing Sheets

(56) References Cited

U.S. PATENT DOCUMENTS

| | | |
|---|---|---|
| 9,720,455 B2 | 8/2017 | Jang |
| 10,091,896 B2 | 10/2018 | Chu |
| 10,394,282 B2 | 8/2019 | Lee et al. |
| 10,520,992 B1 | 12/2019 | Chang et al. |
| 10,620,668 B2 | 4/2020 | Park et al. |
| 10,627,858 B2 | 4/2020 | Seo et al. |
| 10,678,428 B2 | 6/2020 | Kim et al. |
| 10,686,028 B2 | 6/2020 | Ahn et al. |
| 10,698,450 B2 | 6/2020 | Mehandjiysky et al. |
| 10,736,224 B2 * | 8/2020 | Park .................... G06F 1/1615 |
| 10,754,377 B2 | 8/2020 | Siddiqui |
| 10,775,852 B2 | 9/2020 | Kim et al. |
| 10,838,458 B1 | 11/2020 | Park et al. |
| 10,912,213 B2 * | 2/2021 | Woo .................... G06F 1/1679 |
| 11,042,196 B2 * | 6/2021 | Mangum ................ G06F 1/166 |
| 2012/0196651 A1 | 8/2012 | Nakamura |
| 2012/0236484 A1 | 9/2012 | Miyake |
| 2014/0055920 A1 | 2/2014 | Liang |
| 2015/0085433 A1 | 3/2015 | Kim |
| 2015/0330614 A1 | 11/2015 | Lee et al. |
| 2017/0013735 A1 | 1/2017 | Choi et al. |
| 2017/0302766 A1 | 10/2017 | Lee et al. |
| 2017/0347476 A1 | 11/2017 | Hwang et al. |
| 2018/0132020 A1 | 5/2018 | Seo et al. |
| 2018/0210497 A1 | 7/2018 | Lin |
| 2018/0232191 A1 | 8/2018 | Becze et al. |
| 2018/0275725 A1 | 9/2018 | Lin et al. |
| 2019/0029135 A1 * | 1/2019 | Park .................... E05D 11/082 |
| 2019/0140342 A1 | 5/2019 | Lim et al. |
| 2019/0200470 A1 * | 6/2019 | Woo .................... G06F 1/1681 |
| 2020/0081502 A1 | 3/2020 | Lin |

FOREIGN PATENT DOCUMENTS

| | | |
|---|---|---|
| KR | 10-0786624 B1 | 12/2007 |
| KR | 10-2016-0081479 A | 7/2016 |
| KR | 10-2017-9006709 A | 1/2017 |
| KR | 10-2017-0070636 A | 6/2017 |
| KR | 10-2017-0120985 A | 11/2017 |
| KR | 10-2017-0134001 A | 12/2017 |
| KR | 10-2018-0052291 A | 5/2018 |
| KR | 10-2018-0120004 A | 11/2018 |
| WO | 2018090791 A1 | 5/2018 |
| WO | 2018/137536 A1 | 8/2018 |
| WO | 2018/171484 A1 | 9/2018 |
| WO | 2018210187 A1 | 11/2018 |

OTHER PUBLICATIONS

Office Action dated Jul. 5, 2022.
Indian Office Action dated Jan. 25, 2023.
Korean Office Action dated Jan. 14, 2023.

* cited by examiner

PORTABLE COMMUNICATION DEVICE HOUSING WITH CURVED CORNERS

CROSS-REFERENCE TO RELATED APPLICATION(S)

This application is a Continuation of U.S. patent application Ser. No. 16/747,723 filed on Jan. 21, 2020, which is based on and claims priority under 35 U.S.C. 119 to Korean Patent Application No. 10-2019-0017697, filed on Feb. 15, 2019, in the Korean Intellectual Property Office, the disclosures of which are herein incorporated by reference in their entireties.

TECHNICAL FIELD

One or more embodiments of the instant disclosure generally relate to a housing, a method of producing the same, and an electronic device including the same.

BACKGROUND

Electronic devices, for example, portable electronic devices, have been introduced into the market in various sizes depending on their respective functions and user preference. Thus, in designing the electronic devices, manufacturers are concerned with functionality, minimizing the size of the devices, and their external appearance. One way to differentiate electronic devices of a particular manufacturer from others in the market is to have devices with improved aesthetic design and excellent durability, which may be preferred by users.

Recently, differences in the functionality of devices of different manufacturers have been reduced, and thus the above described physical characteristics of the devices have become increasingly important as a differentiating factor that allows a particular device to stand out in the market. Currently, there exists a market trend to increase the rigidity of the electronic devices, while maintaining a slim profile for the devices. As part of this trend, parts of various structures (e.g., housings) of the electronic device may be implemented with a metal material, thereby helping to reinforce rigidity of the slimmed electronic device.

A housing of the electronic device may include a conductive member (e.g., metal member) at least partially disposed for rigidity reinforcement and to enhance the external appearance of the device. For example, the housing may be formed by insert injection of a polymer member (e.g., PC) into a conductive member. Such a housing may be colored on the outside (e.g., on the side surface, at least part of the front surface, or the rear surface) for the enhanced external appearance, and at least part of the colored areas may be processed through a machine tool such as a milling machine. For example, the housing may be colored through an anodizing process, and the colored area may be at least partially processed (e.g., milling processed) by a forming tool to form a planer surface or a curved surface. Further, the processed area may again be colored in a color different from the first color formed by the first or primary anodizing process through another anodizing process.

The electronic device may have a rectangular bar shape and thus have four corners with substantially the same radius of curvature along the side surface. In that case, even if milling is carried out through the forming tool, processing lines formed through the corners having the same radius of curvature may be constant.

In the case of a foldable electronic device, a first housing and a second housing may be rotatably coupled by a hinge module, and a flexible display may be disposed across the first housing and the second housing. In this case, the radii of curvature of the inner corners of the housing, that is, the corners disposed on the inside of the electronic device when the device is folded, should be smaller than the radii of curvature of the outer corners of the first housing and/or the second housing. This is because the first housing and the second housing may be used as a support means of the flexible display. When the radius of curvature of the portion supporting the flexible display is large, the flexible display may not be properly supported. And thus, the size of the black matrix (BM) area or bezel around the flexible display may increase, which may be undesirable. Thus, the first housing and/or the second housing may include corners having different radii of curvature.

In this case, as described above, when a processing line is formed by the forming tool in the primary colored area, the processing line may be formed along the side surface at the outer corners with the relatively large radius of curvature (e.g., the outer corners of the first housing and/or the second housing). This allows the corners with the relatively small radius of curvature (e.g., the inner corners when the first housing and the second housing face each other) to be processed separately by a separate tool (e.g., ball tool). However, this involves a complicated work process, and processing lines formed through different processes do not coincide with each other, which may significantly reduce the aesthetic appearance of the electronic device.

The electronic device may include an acoustic module (e.g., speaker module and/or microphone module) disposed within the housing. Such an acoustic module is produced in an assembly and disposed adjacent to an opening formed in the housing to allow sounds produced by the speaker, for example, to be transmitted through the opening. For example, the acoustic module assembly may be secured to the housing through a separating member (e.g., mesh) and/or an adhesive member disposed to enclose the opening. Thus, the adhesion area between the acoustic module assembly and the housing may be important. However, the opening formed in the housing may have the same shape at the outer surface of the side member and at the inner surface of the housing (e.g., a plurality of neighboring circular openings). This may reduce the bonding area of the housing available to be bonded with the acoustic module assembly, thereby sound transmission may be adversely affected (e.g., sound quality may be deteriorated due to sound leakage).

The above information is presented as background information only to assist with an understanding of the disclosure. No determination has been made, and no assertion is made, as to whether any of the above might be applicable as prior art with regard to the disclosure.

SUMMARY

According to an embodiment of the disclosure, an electronic device includes a foldable housing including a hinge module; a first housing connected to the hinge module and including a first surface facing in a first direction, a second surface facing in a direction opposite to the first direction, and a first side member enclosing a first space between the first surface and the second surface; and a second housing connected to the hinge module and including a third surface facing in a second direction, a fourth surface facing in a direction opposite to the second direction, and a second side member enclosing a second space between the third surface and the fourth surface, wherein the first housing and the second housing are foldably coupled to each other along the hinge module so as to at least partially face each other in a folded state, wherein the first side member includes a first side surface having a first length; a second side surface extended toward the hinge module from the first side surface through a first corner having a first radius of curvature and having a second length smaller than the first length; a third side surface extended from the second side surface so as to at least partially coincide with the hinge module through a second corner having a second radius of curvature smaller than the first radius of curvature; and a processed area extended from the first side surface to the third side surface through the second side surface, wherein a vertical distance between a first boundary line between the processed area and the first surface and a second boundary line between the processed area and the second surface is substantially equal across the first side surface, the second side surface, and/or the third side surface.

According to an embodiment of the disclosure, a method of producing a housing includes forming a metal base material including side members having corners having different radii of curvature; forming a first colored area in a first color formed using an anodizing process in the metal base material; forming a first processed area by cutting at least a portion of the first colored area along a side surface including at least one corner of the side members, when the at least one corner has a relatively small radius of curvature; and forming a second processed area by post-processing the first processed area at a side surface adjacent to the at least one corner.

According to an embodiment of the disclosure, an electronic device includes a housing including a front plate, a rear plate facing in a direction opposite to that of the front plate, and a side member enclosing a space between the front plate and the rear plate and including at least one first opening; and an acoustic module assembly disposed to correspond to the at least one first opening in the space. The acoustic module assembly includes an acoustic module housing including an acoustic module; a second opening disposed between the acoustic module and the at least one first opening; and at least one adhesive member disposed at an outer surface of the acoustic module housing and enclosing the second opening. The at least one first opening includes a first space connected to the second opening; and a second space connected to the first space and having a lateral cross section larger than a lateral cross section of the first space, the lateral cross section of the first space being limited by a stepped portion of an engraved structure. The first space and the second space forms a sound conduit for the acoustic module.

Additional aspects will be set forth in part in the description which follows and, in part, will be apparent from the description, or may be learned by practice of the presented embodiments.

BRIEF DESCRIPTION OF THE DRAWINGS

In the drawings, the same or similar reference numerals may be used for the same or similar components. The above and other aspects, features, and advantages of certain embodiments of the present disclosure will be more apparent from the following description taken in conjunction with the accompanying drawings, in which.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Figure 1:
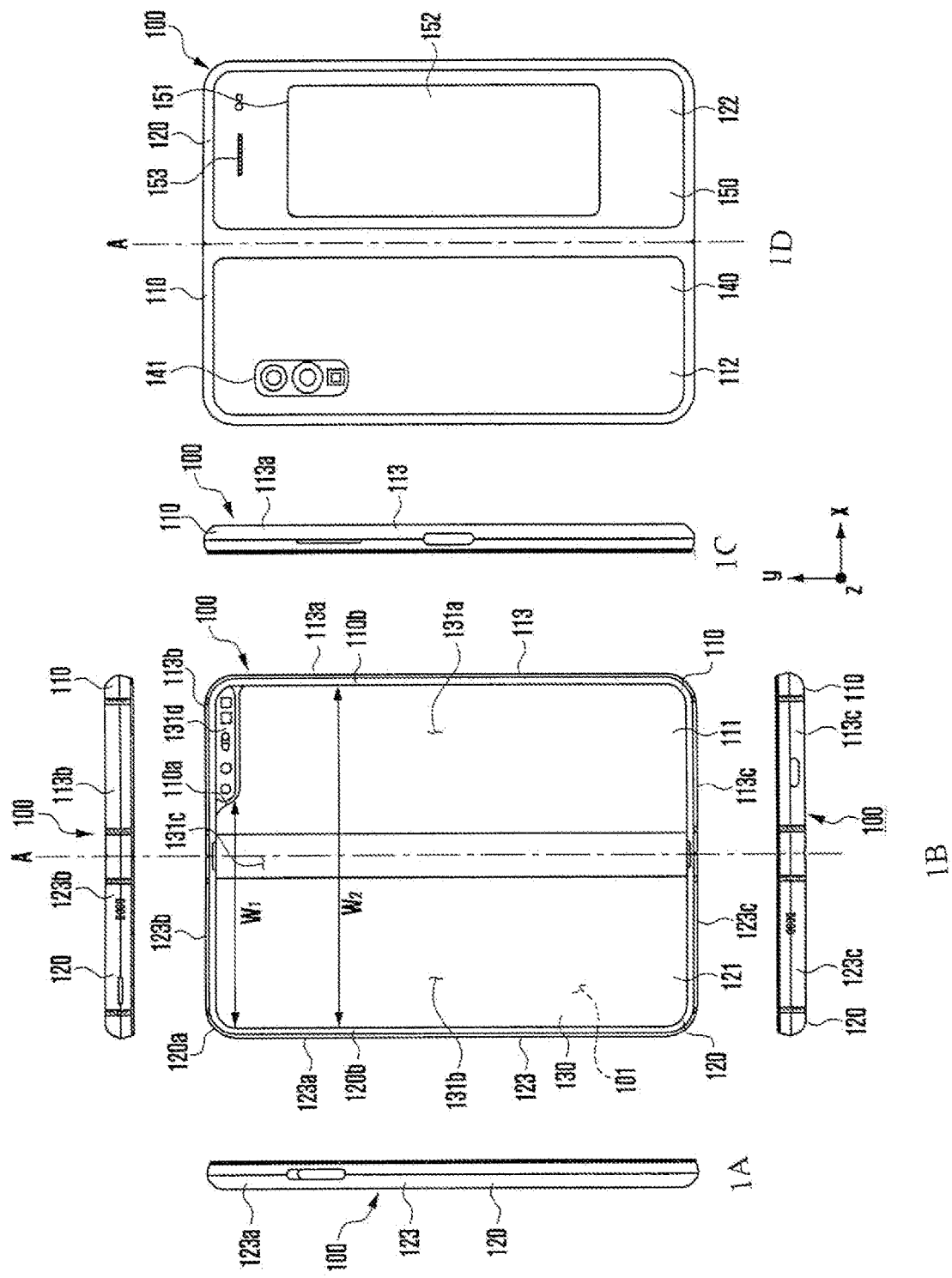
FIGS. 1A to 1D are diagrams illustrating an unfolded state of an electronic device according to various embodiments of the disclosure.

FIG. 1 is a diagram illustrating an unfolded state of an electronic device according to various embodiments of the disclosure.

Referring to FIGS. 1A through 1D, an electronic device 100 may include a pair of housing structures 110 and 120 rotatably coupled via a hinge structure (e.g., hinge structure 164 in FIG. 3) to be folded relative to each other, a hinge cover 165 covering the foldable portion of the pair of housing structures 110 and 120, and a display 130 (e.g., flexible display or foldable display) disposed in the space formed by the pair of housing structures 110 and 120. In the description, the surface on which the display 130 is disposed may be referred to as the front surface of the electronic device 100, and the opposite side of the front surface may be referred to as the rear surface of the electronic device 100. The surface surrounding the space between the front surface and the rear surface may be referred to as the side surface of the electronic device 100.

In one embodiment, the pair of housing structures 110 and 120 may include a first housing structure 110 including a sensor region 131d, a second housing structure 120, a first rear cover 140, and a second rear cover 150. The pair of housing structures 110 and 120 of the electronic device 100 are not limited to the shape or combination illustrated in FIGS. 1 and 2, but may be implemented in various shapes or combinations. For example, in another embodiment, the first housing structure 110 and the first rear cover 140 may be formed as a single body, and the second housing structure 120 and the second rear cover 150 may be formed as a single body.

In one embodiment, the first housing structure 110 and the second housing structure 120 may be disposed at both sides with respect to the folding axis (A) and may be substantially symmetrical with respect to the folding axis (A). In one embodiment, the angle or distance between the first housing structure 110 and the second housing structure 120 may vary depending upon whether the electronic device 100 is in the flat state or closed state, the folded state, or the intermediate state. In one embodiment, the first housing structure 110 includes the sensor region 131d where various sensors are disposed, but may have a symmetrical shape with the second housing structure 120 in other regions. In another embodiment, the sensor region 131d may be disposed in a specific region of the second housing structure 120 or may be replaced.

In one embodiment, during the flat state of the electronic device 100, the first housing structure 110 may be connected to the hinge structure (e.g., hinge structure 164 in FIG. 3), and may include a first surface 111 facing the front surface of the electronic device 100, a second surface 112 facing away from the first surface 111, and a first side member 113 enclosing at least a portion of the space between the first surface 111 and the second surface 112. In one embodiment, the first side member 113 may include a first side surface 113a disposed in parallel with the folding axis (A), a second side surface 113b extending from one end of the first side surface 113a in a direction perpendicular to the folding axis, and a third side surface 113c extending from the other end of the first side surface 113a in a direction perpendicular to the folding axis.

In one embodiment, during the flat state of the electronic device 100, the second housing structure 120 may be connected to the hinge structure (e.g., hinge structure 164 in FIG. 3), and may include a third surface 121 facing the front surface of the electronic device 100, a fourth surface 122 facing away from the third surface 121, and a second side member 123 enclosing at least a portion of the space between the third surface 121 and the fourth surface 122. In one embodiment, the second side member 123 may include a fourth side surface 123a disposed in parallel with the folding axis (A), a fifth side surface 123b extending from one end of the fourth side surface 123a in a direction perpendicular to the folding axis, and a sixth side surface 123c extending from the other end of the fourth side surface 123a in a direction perpendicular to the folding axis. In one embodiment, the third surface 121 may face the first surface 111 in the folded state.

In one embodiment, the electronic device 100 may include a recess 101 formed to accommodate the display 130 through a structural combination of the shapes of the first housing structure 110 and the second housing structure 120. The recess 101 may have substantially the same size as the display 130. In one embodiment, the recess 101 may have two or more different widths in a direction perpendicular to the folding axis (A) due to the sensor region 131d. For example, the recess 101 may have a first width (W1) between a first portion 120a of the second housing structure 120 parallel to the folding axis (A) and a first portion 110a of the first housing structure 110 formed at the edge of the sensor region 131d, and have a second width (W2) between a second portion 120b of the second housing structure 120 and a second portion 110b of the first housing structure 110 that does not correspond to the sensor region 113d and is parallel to the folding axis (A). Here, the second width (W2) may be wider than the first width (W1). In other words, the recess 101 may be formed to have the first width (W1) ranging from the first portion 110a of the first housing structure 110 to the first portion 120a of the second housing structure 120 (asymmetric shape), and the second width (W2) ranging from the second portion 110b of the first housing structure 110 to the second portion 120b of the second housing structure 120 (symmetric shape). In one embodiment, the first portion 110a and the second portion 110b of the first housing structure 110 may be located at different distances from the folding axis (A). The width of the recess 101 is not limited to the example shown above. In various embodiments, the recess 101 may have two or more different widths owing to the shape of the sensor region 113d or the asymmetry of the first housing structure 110 or the second housing structure 120.

In one embodiment, at least a portion of the first housing structure 110 and the second housing structure 120 may be made of a metal or non-metal material having a rigidity value selected to support the display 130.

In one embodiment, the sensor region 131d may be formed to have a preset area near to one corner of the first housing structure 110. However, the arrangement, shape, or size of the sensor region 131d is not limited to the illustrated example. For example, in a certain embodiment, the sensor region 131d may be formed at another corner of the first housing structure 110 or in any region between the upper corner and the lower corner. In another embodiment, the sensor region 131d may be disposed at a portion of the second housing structure 120. In another embodiment, the sensor region 131d may be formed to extend between the first housing structure 110 and the second housing structure 120. In one embodiment, to perform various functions, the electronic device 100 may include components exposed to the front surface of the electronic device 100 through the sensor region 113d or through one or more openings provided in the sensor region 131d. The components may include, for example, at least one of a front camera, a receiver, a proximity sensor, an illuminance sensor, an iris recognition sensor, an ultrasonic sensor, or an indicator.

In one embodiment, the first rear cover 140 may be disposed on the second surface 112 of the first housing structure 110 and may have a substantially rectangular periphery. In one embodiment, at least a portion of the periphery may be wrapped by the first housing structure 110. Similarly, the second rear cover 150 may be disposed on the fourth surface 122 of the second housing structure 120, and at least a portion of the periphery thereof may be wrapped by the second housing structure 120.

In the illustrated embodiment, the first rear cover 140 and the second rear cover 150 may have a substantially symmetrical shape with respect to the folding axis (A). In another embodiment, the first rear cover 140 and the second rear cover 150 may have various different shapes. In another embodiment, the first rear cover 140 may be formed as a single body with the first housing structure 110, and the second rear cover 150 may be formed as a single body with the second housing structure 120.

In one embodiment, the first rear cover 140, the second rear cover 150, the first housing structure 110, and the second housing structure 120 may be combined with each other so as to provide a space where various components (e.g., printed circuit board, antenna module, sensor module, and battery) of the electronic device 100 can be arranged. In one embodiment, one or more components may be disposed on or visually exposed via the rear surface of the electronic device 100. For example, one or more components or sensors may be visually exposed through the first rear region 141 of the first rear cover 140. The sensors may include a proximity sensor, a rear camera, and/or a flash. In another embodiment, at least a portion of the sub-display 152 may be visually exposed through the second rear region 151 of the second rear cover 150.

The display 130 may be disposed on the space formed by the pair of housing structures 110 and 120. For example, the display 130 may be seated in the recess (e.g., recess 101 in FIG. 1) formed by the pair of housing structures 110 and 120, and may be disposed to substantially occupy most of the front surface of the electronic device 100. Hence, the front surface of the electronic device 100 may include the display 130, a portion (e.g., edge region) of the first housing structure 110 close to the display 130, and a portion (e.g. edge region) of the second housing structure 120 close to the display 130. In one embodiment, the rear surface of the electronic device 100 may include the first rear cover 140, a portion (e.g., edge region) of the first housing structure 110 close to the first rear cover 140, the second rear cover 150, and a portion (e.g. edge region) of the second housing structure 120 close to the second rear cover 150.

In one embodiment, the display 130 may refer to a display whose at least a portion may be deformed into a flat or curved surface. In one embodiment, the display 130 may include a folding region 131c, a first region 131a disposed on one side (e.g., right side of the folding region 131c) with respect to the folding region 131c, and a second region 131b disposed on the other side (e.g., left side of the folding region 131c). For example, the first region 131a may be disposed on the first surface 111 of the first housing structure 110, and the second region 131b may be disposed on the third surface 121 of the second housing structure 120. This demarcation of the display 130 is only an example, and the display 130 may be subdivided into plural regions (e.g., four or more regions) according to the structure or functionality. For example, in the embodiment of FIG. 1, the area of the display 130 may be subdivided with respect to the folding region 131c or the folding axis (A) extending parallel to the y-axis. However, in another embodiment, the area of the display 130 may be subdivided with respect to a different folding region (e.g., folding region parallel to the x-axis) or a different folding axis (e.g., folding axis parallel to the x-axis). The aforementioned subdivision of the display is only a physical demarcation based on the pair of housing structures 110 and 120 and the hinge structure (e.g., hinge structure 164 in FIG. 3), and the display 130 may substantially present one full screen through the pair of housing structures 110 and 120 and the hinge structure (e.g., hinge structure 164 in FIG. 3). In one embodiment, the first region 131a and the second region 131b may have a symmetrical shape with respect to the folding region 131c. Although the first region 131a may include a notch region (e.g., notch region 133 in FIG. 3) cut according to the presence of the sensor region 131d, it may have a symmetrical shape with the second region 131b in other portions. In other words, the first region 131a and the second region 131b may include portions with symmetrical shapes and portions with asymmetrical shapes.

Figure 2:
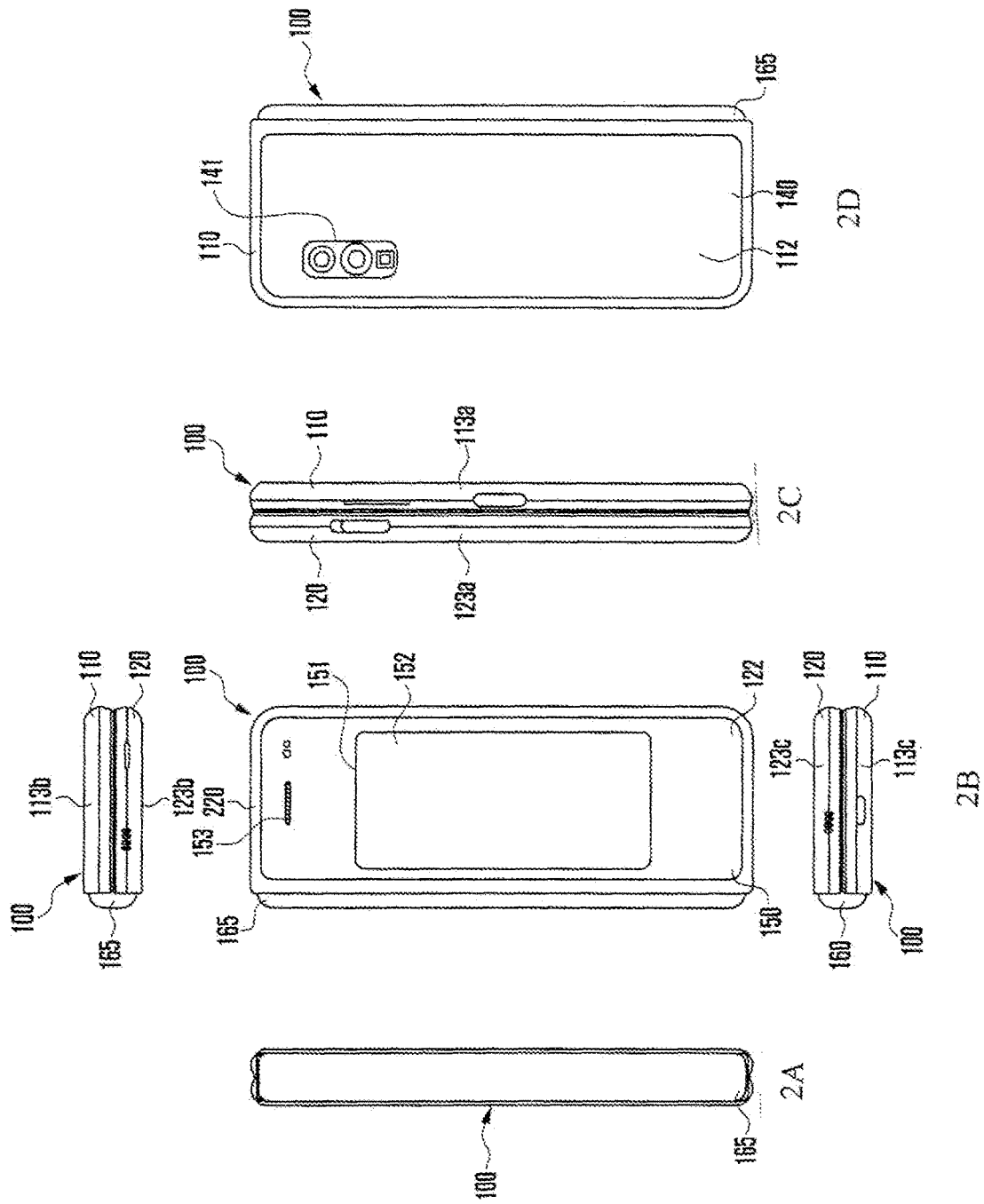
FIGS. 2A to 2D are diagrams illustrating a folded state of the electronic device of FIG. 1 according to various embodiments of the disclosure.

FIG. 2 is a diagram illustrating a folded state of the electronic device of FIG. 1 according to various embodiments of the disclosure.

Figure 3:
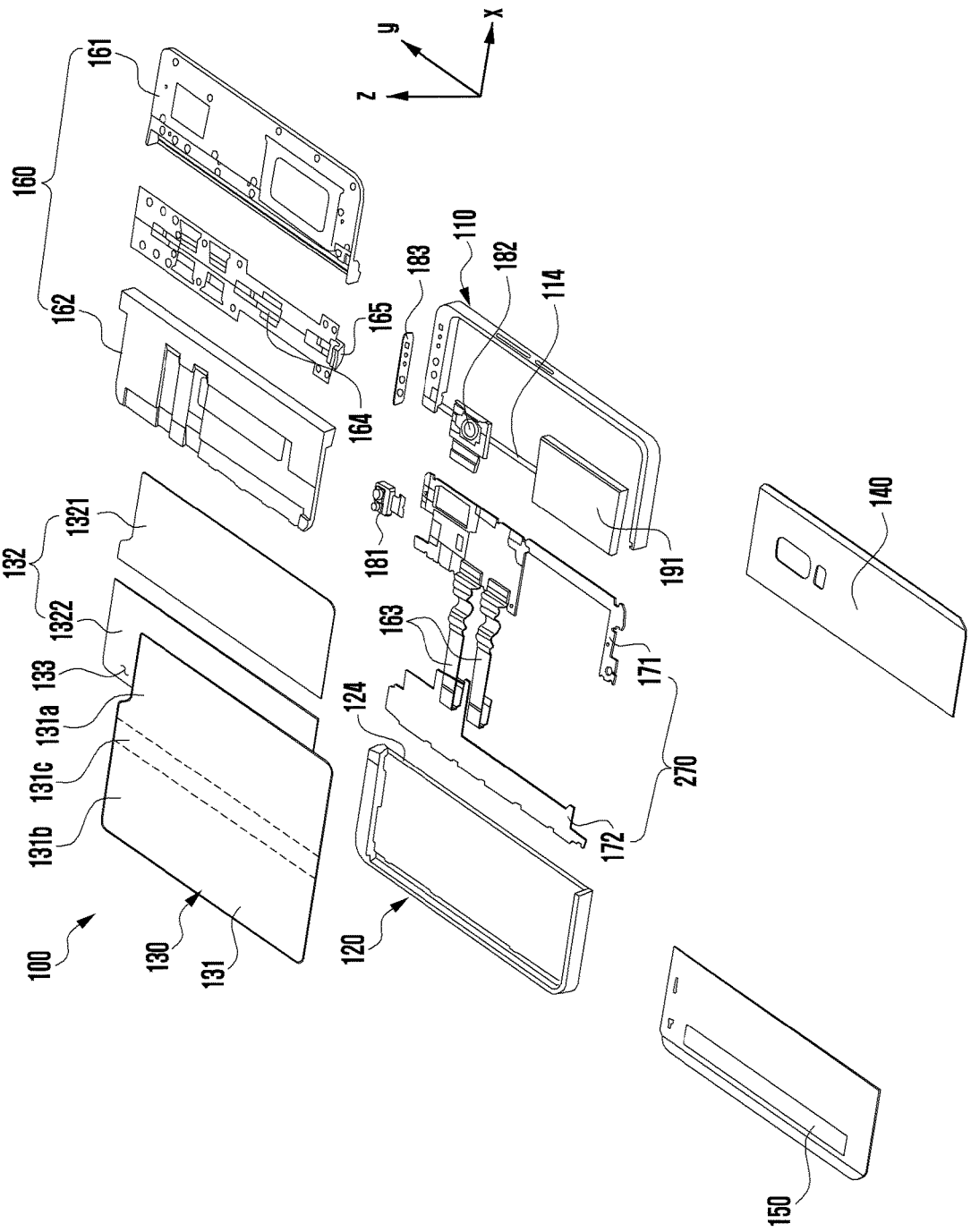
FIG. 3 is an exploded perspective view illustrating an electronic device according to various embodiments of the disclosure.

Referring to FIGS. 2A through 2D, the hinge cover 165 may be disposed between the first housing structure 110 and the second housing structure 120 so as to cover the internal components (e.g., hinge structure 164 in FIG. 3). In one embodiment, the hinge cover 165 may be covered by portions of the first housing structure 110 and the second housing structure 120 or be exposed to the outside according to the operating state (e.g., flat state or folded state) of the electronic device 100.

For example, when the electronic device 100 is in the flat state as illustrated in FIG. 1, the hinge cover 165 may be covered by the first housing structure 110 and the second housing structure 120 so as not to be exposed. When the electronic device 100 is in the folded state (e.g., completely folded state) as illustrated in FIG. 2, the hinge cover 165 may be exposed to the outside between the first housing structure 110 and the second housing structure 120. When the electronic device 100 is in the intermediate state where the first housing structure 110 and the second housing structure 120 make a certain angle, the hinge cover 165 may be partially exposed to the outside between the first housing structure 110 and the second housing structure 120. In this case, the exposed portion may be less than that for the fully folded state. In one embodiment, the hinge cover 165 may include a curved surface.

Next, a description is given of configurations of the first housing structure 110 and the second housing structure 120 and regions of the display 130 according to the operating state (e.g. flat state or folded state) of the electronic device 100.

In one embodiment, when the electronic device 100 is in the flat state (e.g., state of FIG. 1), the first housing structure 110 and the second housing structure 120 may make an angle of 180 degrees, and the first region 131a and the second region 131b of the display may be disposed to face in the same direction. In addition, the folding region 131c may be coplanar with the first region 131a and the second region 131b.

In one embodiment, when the electronic device 100 is in the folded state (e.g., state of FIG. 2), the first housing structure 110 and the second housing structure 120 may be disposed to face each other. The first region 131a and the second region 131b of the display 130 may face each other, making a narrow angle (e.g., between 0 degrees and 10 degrees). At least a portion of the folding region 131c may form a curved surface with a preset curvature.

In one embodiment, when the electronic device 100 is in the intermediate state, the first housing structure 110 and the second housing structure 120 may be disposed to make a certain angle. The first region 131a and the second region 131b of the display 130 may form an angle greater than that for the folded state and less than that for the flat state. At least a portion of the folding region 131c may form a curved surface with a preset curvature. This curvature may be less than that for the folded state.

FIG. 3 is an exploded perspective view of an electronic device according to an embodiment of the disclosure.

Referring to FIG. 3, in one embodiment, the electronic device 100 may include a display 130, a support member assembly 160, at least one printed circuit board 170, a first housing structure 110, a second housing structure 120, a first rear cover 140, and a second rear cover 150. In the description, the display 130 may be referred to as a display unit, display module, or display assembly.

The display 130 may include a display panel 131 (e.g., flexible display panel), and at least one plate 132 or layer on which the display panel 131 is seated. In one embodiment, the plate 132 may be disposed between the display panel 131 and the support member assembly 160. The display panel 131 may be disposed in at least a portion of one surface of the plate 132. The plate 132 may include a first plate 1321 and a second plate 1322 divided based on the hinge structure 164. The plate 132 may include at least one member that cannot be folded together when the first housing structure 110 and the second housing structure 120 rotate in a folded and/or unfolded state based on the hinge structure 164. The plate 132 may include at least one subsidiary material layer (e.g., graphite member) and/or a conductive plate (e.g., SUS sheet or Cu sheet) disposed at a rear surface of the display panel 131. In one embodiment, the plate 132 may be formed in a shape corresponding to the display panel 131. For example, a partial area of the first plate 1321 may be formed in a shape corresponding to the notch area 133 of the display panel 131. In another embodiment, the conductive plate may be integrally formed through a bendable connecting area.

The support member assembly 160 may include a first support member 161, a second support member 162, a hinge structure 164 disposed between the first support member 161 and the second support member 162, a hinge cover 165 to cover the hinge structure 164 when viewed from the outside, and a wiring member 163 (e.g., flexible printed circuit board (FPCB)) that crosses the first support member 161 and the second support member 162.

In one embodiment, the support member assembly 160 may be disposed between the plate 132 and at least one printed circuit board 170. For example, the first support member 161 may be disposed between the first region 131a of the display 130 and the first printed circuit board 171. The second support member 162 may be disposed between the second region 131b of the display 130 and the second printed circuit board 172.

In one embodiment, at least a portion of the wiring member 163 and the hinge structure 164 may be disposed within the support member assembly 160. The wiring member 163 may be disposed in a direction crossing the first support member 161 and the second support member 162 (e.g., x-axis direction). The wiring member 163 may be disposed in a direction (e.g., x-axis direction) perpendicular to the folding axis (e.g., y-axis or folding axis (A) in FIG. 2) of the folding region 131c.

The at least one printed circuit board 170 may include, as described above, the first printed circuit board 171 disposed on the side of the first support member 161, and the second printed circuit board 172 disposed on the side of the second support member 162. The first printed circuit board 171 and the second printed circuit board 172 may be disposed inside the space formed by the support member assembly 160, the first housing structure 110, the second housing structure 120, the first rear cover 140, and the second rear cover 150. Various components for implementing functions of the electronic device 100 may be mounted on the first printed circuit board 171 and the second printed circuit board 172.

In an embodiment, the first housing structure 110 may include a first printed circuit board 171, a battery 191, at least one sensor module 181, or at least one camera module 182 disposed in a space formed through the first support member 161. The first housing structure 110 may include a window glass 183 disposed to protect at least one sensor module 181 and at least one camera module 182 at a position corresponding to the notch area 133 of the display 130. In an embodiment, the second housing structure 120 may include a second printed circuit board 172 disposed in a space formed through the second support member 162. According to one embodiment, the first housing structure 110 and the first support member 161 may be integrally formed. According to one embodiment, the second housing structure 120 and the second support member 162 may also be integrally formed.

In one embodiment, the first housing structure 110 may include a first rotary support surface 114, and the second housing structure 120 may include a second rotary support surface 124 corresponding to the first rotary support surface 114. The first rotary support surface 114 and the second rotary support surface 124 may include a curved surface corresponding to the curved surface included in the hinge cover 165.

In one embodiment, when the electronic device 100 is in the flat state (e.g., state of FIG. 1), the first rotary support surface 114 and the second rotary support surface 124 may cover the hinge cover 165 so that the hinge cover 165 may be not or minimally exposed to the rear surface of the electronic device 100. When the electronic device 100 is in the folded state (e.g., state of FIG. 2), the first rotary support surface 114 and the second rotary support surface 124 may rotate along the curved surface included in the hinge cover 165 so that the hinge cover 165 may be maximally exposed to the rear surface of the electronic device 100.

Certain embodiments of the disclosure may provide a housing, a method of producing the same, and an electronic device including the same.

Certain embodiments of the disclosure may provide a housing in which a uniform processing line may be formed in the housing that includes corners having different radii of curvature, a method of producing the housing, and an electronic device including the same.

Certain embodiments of the disclosure may provide a housing, a method of producing the housing, and an electronic device including the same in which the electronic device has enhanced aesthetic appearance due to a uniform processing line in the housing that includes corners having different radii of curvature.

Certain embodiments of the disclosure may provide a housing, a method of producing the housing, and an electronic device including the same configured for sound transmission. The sound transmission may be improved because an adhesion area between an acoustic module assembly and the housing may be extended regardless of the size and/or shape of a sound transmission opening formed in the outer surface of the housing.

Figure 4:
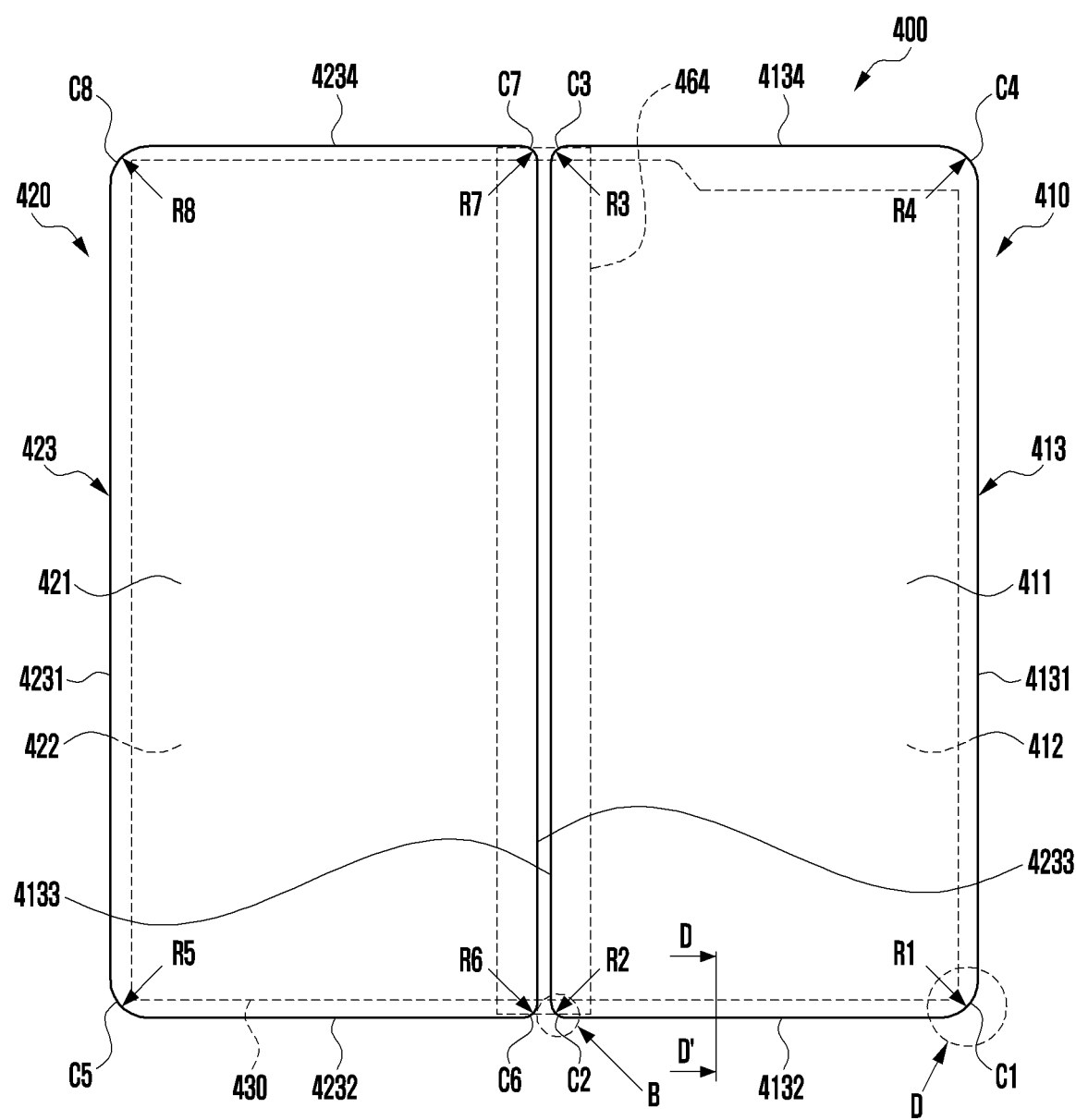
FIG. 4 is a diagram illustrating a configuration of an electronic device according to an embodiment of the disclosure.

FIG. 4 is a diagram illustrating a configuration of an electronic device 400 according to an embodiment of the disclosure.

The electronic device 400 of FIG. 4 may be at least partially similar to the electronic device 100 of FIG. 1 or may further include other components of the electronic device 100 of FIG. 1.

With reference to FIG. 4, the electronic device 400 (e.g., the electronic device 100 of FIG. 1) may include a first housing 410 (e.g., the first housing 110 of FIG. 1) including a first surface 411 (e.g., the first surface 111 of FIG. 1), a second surface 412 (e.g., the second surface 112 of FIG. 1) facing in a direction opposite to that of the first surface 411, and a first side member 413 (e.g., the first side member 113 of FIG. 1) forming a peripheral surface of the first housing and enclosing a first space between the first surface 411 and the second surface 412. The electronic device 400 can include, for example, a portable communication device. According to an embodiment, in the unfolded state, the electronic device 400 may include a second housing 420 (e.g., the second housing 120 of FIG. 1) including a third surface 421 (e.g., the third surface 121 of FIG. 1) facing in the same direction as that of the first surface 411, a fourth surface 422 (e.g., the fourth surface 122 of FIG. 1) facing in the same direction as that of the second surface 412, and a second side member 423 (e.g., the second side member 123 of FIG. 1) forming a peripheral surface of the second housing and enclosing a second space between the third surface 421 and the fourth surface 422. According to an embodiment, the first housing 410 and the second housing 420 may be rotatably coupled to each other via a hinge module 464 (e.g., the hinge module 164 of FIG. 3). For example, in the folded state, the first surface 411 and the third surface 421 may face each other, and in the unfolded state, the first surface 411 and the third surface 421 may face the same direction. According to an embodiment, the electronic device may include a flexible display 430 (e.g., the flexible display 130 of FIG. 1) disposed to be at least partially across the first surface 411 and the third surface 421. According to an embodiment, the flexible display 430 may be disposed to receive the support from at least some portions of the first housing 410 and the second housing 420.

According to an embodiment, the first side member 413 may include a first side surface 4131 having a first length, a second side surface 4132 extended toward the hinge module 464 through a first corner C1 having a first radius of curvature R1 from the first side surface 4131 and having a second length smaller than the first length, a third side surface 4133 extended to at least partially coincide with the hinge module 464 through a second corner C2 having a second radius of curvature R2 smaller than the first radius of curvature R1 from the second side surface 4132, and a fourth side surface 4134 extended in a direction toward the first side surface 4131 through a third corner C3 having a third radius of curvature R3 equal to the second radius of curvature R2 from the third side surface 4133. According to an embodiment, the fourth side surface 4134 may be connected to the first side surface 4131 through a fourth corner C4 having a fourth radius of curvature R4 equal to the first radius of curvature R1.

According to an embodiment, the second side member 423 may include a fifth side surface 4231 having a first length, a sixth side surface 4232 extended toward the hinge module 464 through a fifth corner C5 having a fifth radius of curvature R5 equal to the first radius of curvature R1 from the fifth side surface 4231 and having a second length, a seventh side surface 4233 extended to at least partially coincide with the hinge module 464 through a sixth corner C6 having a sixth radius of curvature R6 equal to the second radius of curvature R2 from the sixth side surface 4232, and an eighth side surface 4234 extended in a direction toward the fifth side surface 4231 through a seventh corner C7 having a seventh radius of curvature R7 equal to the third radius of curvature R3 from the seventh side surface 4233. According to an embodiment, the eighth side surface 4234 may be connected to the fifth side surface 4231 through an eighth corner C8 having an eighth radius of curvature R8 equal to the fourth radius of curvature R4.

According to an embodiment, the first corner C1, the fourth corner C4, the fifth corner C5, and the eighth corner C8 may have the same radius of curvature. According to an embodiment, the second corner C2, the third corner C3, the sixth corner C6, and the seventh corner C7 may have the same radius of curvature. For example, the radii of curvature of the second corner C2, the third corner C3, the sixth corner C6, and the seventh corner C7 disposed adjacent to the hinge module 464 may be smaller than those of the first corner C1, the fourth corner C4, the fifth corner C5, and the eighth corner C8 disposed away from the hinge module 464. This is because the second corner C2 and the third corner C3 of the first housing 410 and the sixth corner C6 and the seventh corner C7 of the second housing 420 disposed near the hinge module 464 are made to support the flexible display 430 and have the minimum radius of curvature reduces the BM area between the flexible display 430 and the housings 410 and 420.

Figure 5:
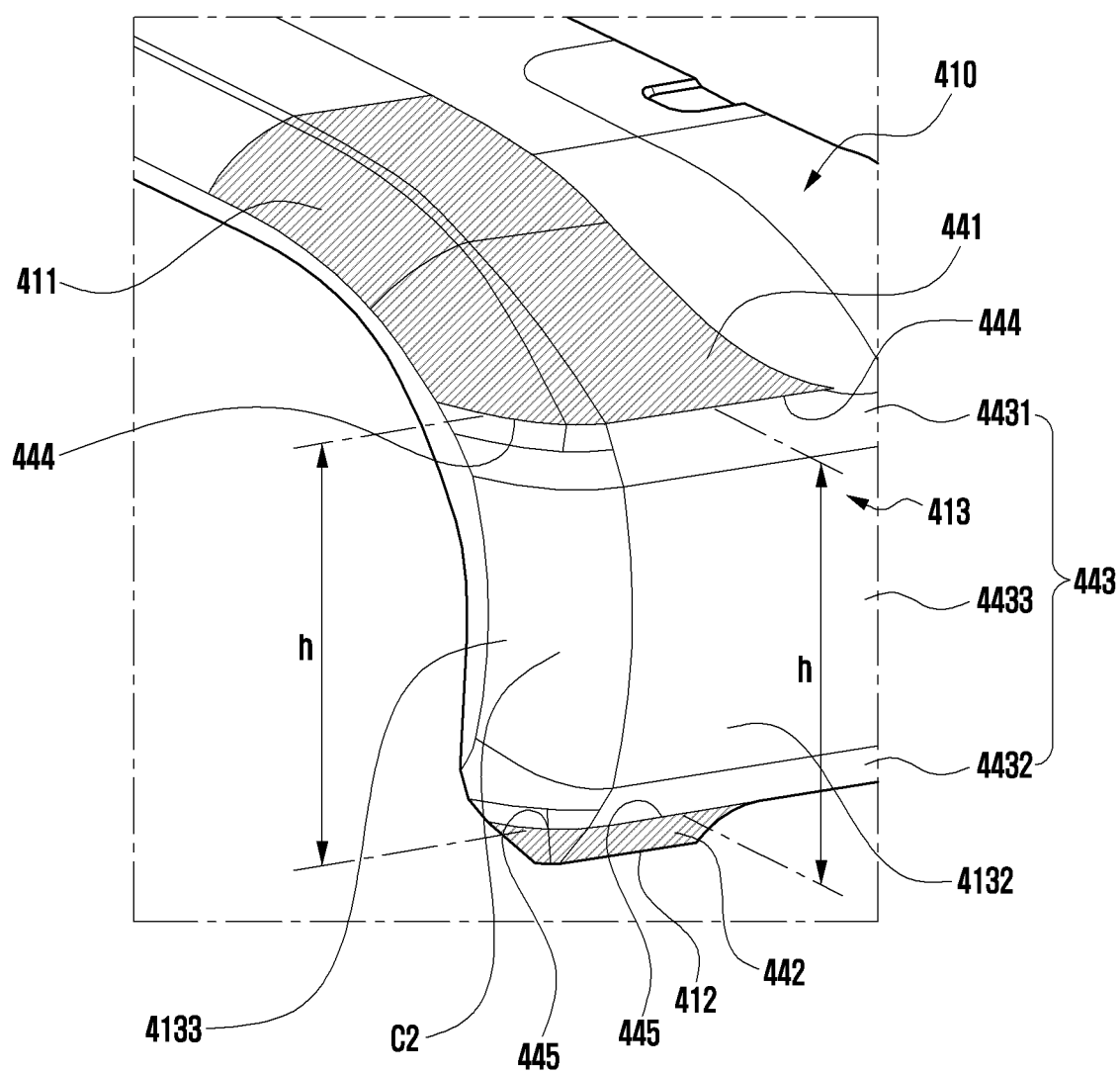
FIG. 5 is a partial perspective view illustrating an area B of FIG. 4 according to an embodiment of the disclosure.

According to an embodiment, the first to fourth side surfaces 4131, 4132, 4133, and 4134 of the first side member 413 and the fifth to eighth side surfaces 4231, 4232, 4233, and 4234 of the second side member 423 may include a processed area (e.g., the processed area 443 of FIG. 5). According to one embodiment, the processed area may be formed by a forming tool (e.g., a cylindrical bite) for milling processing (e.g., cutting processing) that is moved along the first side member 413 and the second side member 423. The processed areas of both side members 413 and 423 may have the same vertical distance (e.g., the vertical distance h of FIG. 5).

FIG. 5 is a partial perspective view illustrating an area B of FIG. 4 according to an embodiment of the disclosure.

Hereinafter, processed shapes of the second side surface 4132 and the third side surface 4133 extended through the second corner C2 having the second radius of curvature R2 are illustrated and described, but processed shapes of the third side surface 4133 and the fourth side surface 4134 extended through the third corner C3 having the third radius of curvature R3, the sixth side surface 4232 and the seventh side surface 4233 extended through the sixth corner C6 having the sixth radius of curvature R6, and the seventh side surface 4233 and the eighth side surface 4234 extended through the seventh corner C7 having the seventh radius of curvature R7 may also be substantially the same.

With reference to FIG. 5, the second side surface 4132 and the third side surface 4133 of the first side member 413 of the first housing 410 may be extended through the second corner C2 having the second radius of curvature R2. According to an embodiment, the first housing 410 may include a first area 441 formed at the first surface 411 (periphery portion of the first surface) and a second area 442 formed at the second surface 412 (periphery portion of the second surface). According to an embodiment, the first housing 410 may include a processed area 443 extended uniformly from the second side surface 4132 to the third side surface 4133 through the second corner C2 between the first area 441 and the second area 442. According to one embodiment, the first area 441 and the second area 442 may include at least one colored area colored in a first color through an anodizing process. According to one embodiment, the processed area 443 may include an area cut by the forming tool from the second side surface 4132 to the third side surface 4133 through the second corner C2. According to an embodiment, the processed area 443 may include a first processed area 4431 (first periphery portion of the second side surface) contacting the first area 441, a second processed area 4432 (second periphery portion of the second side surface) contacting the second area 442, and a third processed area 4433 (or a wall portion) disposed between the first processed area 4431 and the second processed area 4432. According to an embodiment, the third processed area 4433 may have a slope, curvature, and/or shape different from those of the first processed area 4431 and/or the second processed area 4432. In another embodiment, at least a portion of the first area 441 may be included in the second side surface 4132 and the third side surface 4133. In another embodiment, at least a portion of the second area 442 may be included in the second side surface 4132 and the third side surface 4133.

According to an embodiment, a first boundary line 444 formed by the first area 441 and the first processed area 4431 may be extended uniformly through the second side surface 4132, the second corner C2, and the third side surface 4133. According to an embodiment, a second boundary line 445 formed by the second area 442 and the second processed area 4432 may be extended uniformly through the second side surface 4132, the second corner C2, and the third side surface 4133. For example, the vertical distance h between the first boundary line 444 and the second boundary line 445 formed at the second side surface 4132 may be the same as the vertical distance h between the first boundary line 444 and the second boundary line 445 formed at the third side surface 4133.

According to an embodiment, the processed area 443 may exhibit a metallic color different from the first color via forming processing. In another embodiment, the processed area 443 processed through forming processing may be formed in another color by using a coating (e.g., transparent or non-transparent coating) for preventing corrosion or separation. In another example, the other color may be deposited via the anodizing process.

Figure 6:
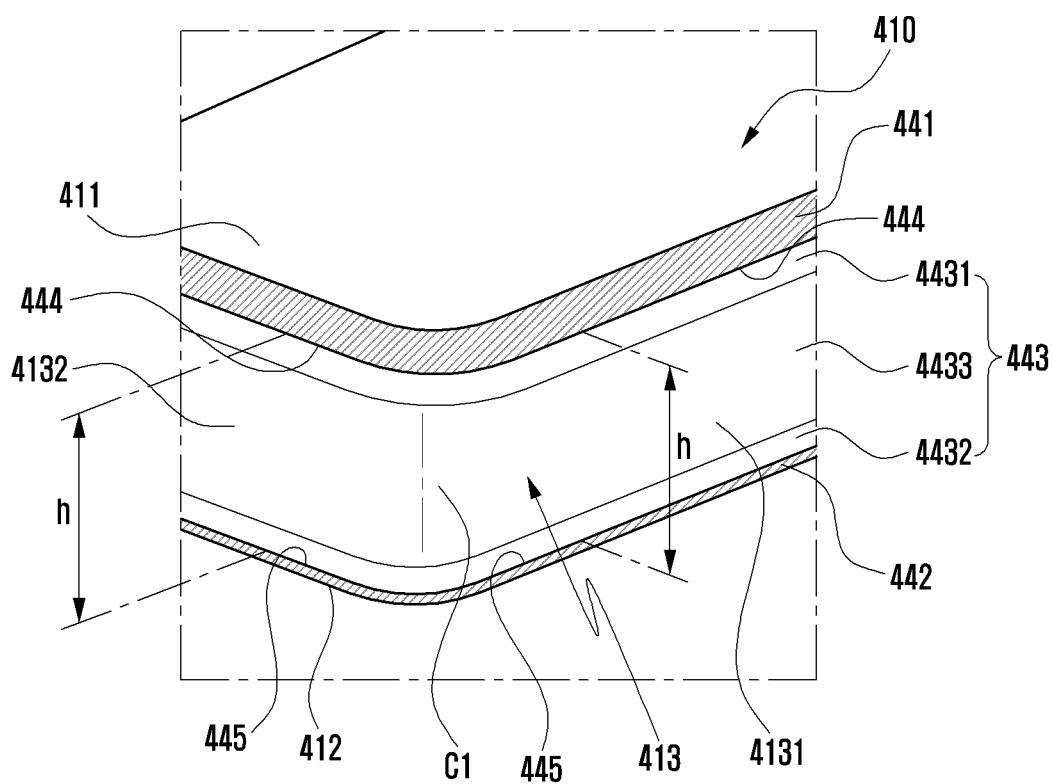
FIG. 6 is a partial perspective view illustrating an area D of FIG. 4 according to an embodiment of the disclosure.

FIG. 6 is a partial perspective view illustrating an area D of FIG. 4 according to an embodiment of the disclosure.

Hereinafter, processed shapes of the first side surface 4131 and the second side surface 4132 extended through the first corner C1 having the first radius of curvature R1 are illustrated and described, but processed shapes of the fourth side surface 4134 and the first side surface 4131 extended through the fourth corner C4 having the fourth radius of curvature R4, the fifth side surface 4231 and the sixth side surface 4232 extended through the fifth corner C5 having the fifth radius of curvature R5, and the eighth side surface 4234 and the fifth side surface 4231 extended through the eighth corner C8 having the eighth radius of curvature R8 may also be substantially the same.

With reference to FIG. 6, the first surface 411, the second surface 412, and the first side member 413 of the first housing 410 may be joined at the first corner C1 having the first radius of curvature R1. According to an embodiment, the first housing 410 may include a first area 441 formed at the first surface 411 and a second area 442 formed at the second surface 412. According to an embodiment, the first housing 410 may include a processed area 443 extended uniformly from the first side surface 4131 to the second side surface 4132 through the first corner C1 between the first area 441 and the second area 442. According to one embodiment, the first area 441 and the second area 442 may include at least one colored area colored in a first color through an anodizing process. According to an embodiment, the processed area 443 may include an area cut by the forming tool from the first side surface 4131 to the second side surface 4132 through the first corner C1. According to an embodiment, the processed area 443 may include a first processed area 4431 contacting the first area 441, a second processed area 4432 contacting the second area 442, and a third processed area 4433 disposed between the first processed area 4431 and the second processed area 4432. According to an embodiment, the third processed area 4433 may have a slope, curvature, and/or shape different from those of the first processed area 4431 and/or the second processed area 4432. In another embodiment, at least a portion of the first area 441 may be included in the second side surface 4132 and the third side surface 4133. In another embodiment, at least a portion of the second area 442 may be included in the second side surface 4132 and the third side surface 4133.

According to an embodiment, a first boundary line 444 formed by the first area 441 and the first processed area 4431 may be extended uniformly through the first side surface 4131, the first corner C1, and the second side surface 4132. According to an embodiment, a second boundary line 445 formed by the second area 442 and the second processed area 4432 may be extended uniformly through the first side surface 4131, the first corner C1, and the second side surface 4132. For example, the vertical distance h between the first boundary line 444 and the second boundary line 445 formed at the first side surface 4131 may be the same to the vertical distance h between the first boundary line 444 and the second boundary line 445 formed at the second side surface 4132. Accordingly, the vertical distance h between the two boundary lines 444 and 445 formed through the first side surface 4131, the first corner C10, the second side surface 4132, the second corner C2, and the third side surface 4133 may be substantially the same.

FIGS. 7A to 7E are cross-sectional views illustrating processed shapes of a second side surface 4132 and/or a third side surface 4133 according to various embodiments of the disclosure.

FIGS. 7A to 7E illustrate shapes of the processed area of the second side surface 4132 and the third side surface 4133. However, the disclosure is not limited thereto, and processed areas of the first side surface 4131, the fourth side surface 4134, the fifth side surface 4231, the sixth side surface 4232, the seventh side surface 4233, and the eighth side surface 4234 may also have substantially the same configuration.

Figure 7A:
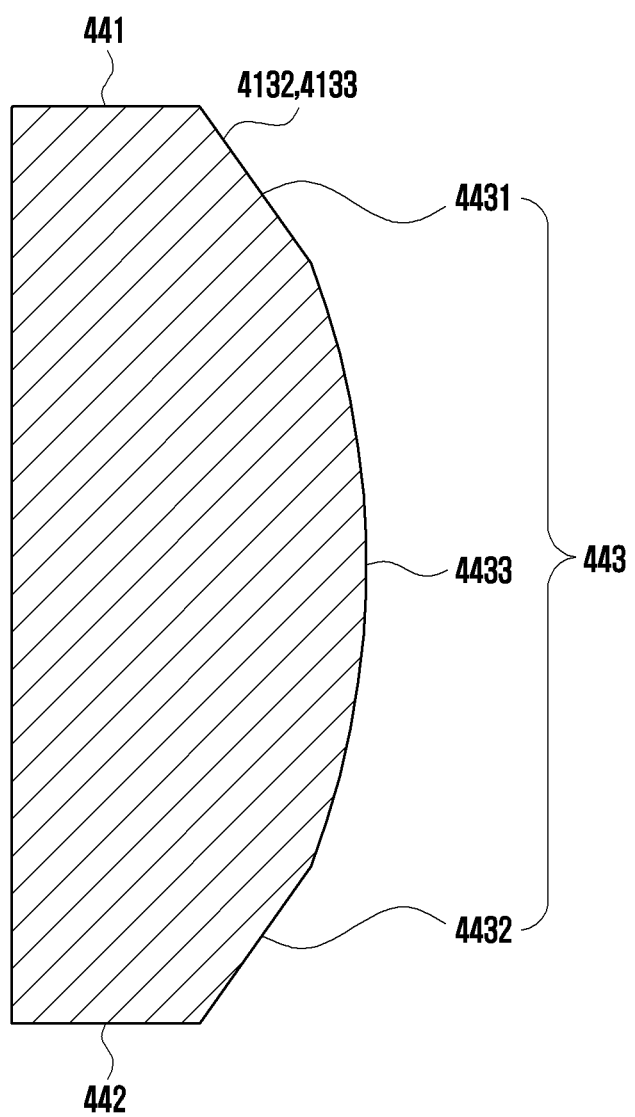
FIGS. 7A to 7E are cross-sectional views illustrating processed shapes of a second side surface and/or a third side surface according to various embodiments of the disclosure.

With reference to FIG. 7A, the second side surface 4132 and/or the third side surface 4133 may include a processed area 443 disposed between the first area 441 and the second area 442. According to one embodiment, the processed area 443 may include a first processed area 4431 contacting the first area 441, a second processed area 4432 contacting the second area 442, and a third processed area 4433 disposed between the first processed area 4431 and the second processed area 4432.

According to an embodiment, the third processed area 4433 may include a curved surface protruded outward so as to have a specific radius of curvature. According to an embodiment, the first processed area 4431 may be a plane connecting the third processed area 4433 and the first area 441. According to an embodiment, the second processed area 4432 may also be a plane connecting the third processed area 4433 and the second area 442. According to an embodiment, the third processed area 4433 formed at the second side surface 4132 and the third processed area 4433 formed at the third side surface 4133 may have different curvatures. In this case, the curvature of the third processed area 4433 of the third side surface 4133 may be formed via post-processing (e.g., ball processing). In another embodiment, the third processed area 4433 of the third side surface 4133 may be formed to be a plane through post-processing.

Figure 7B:
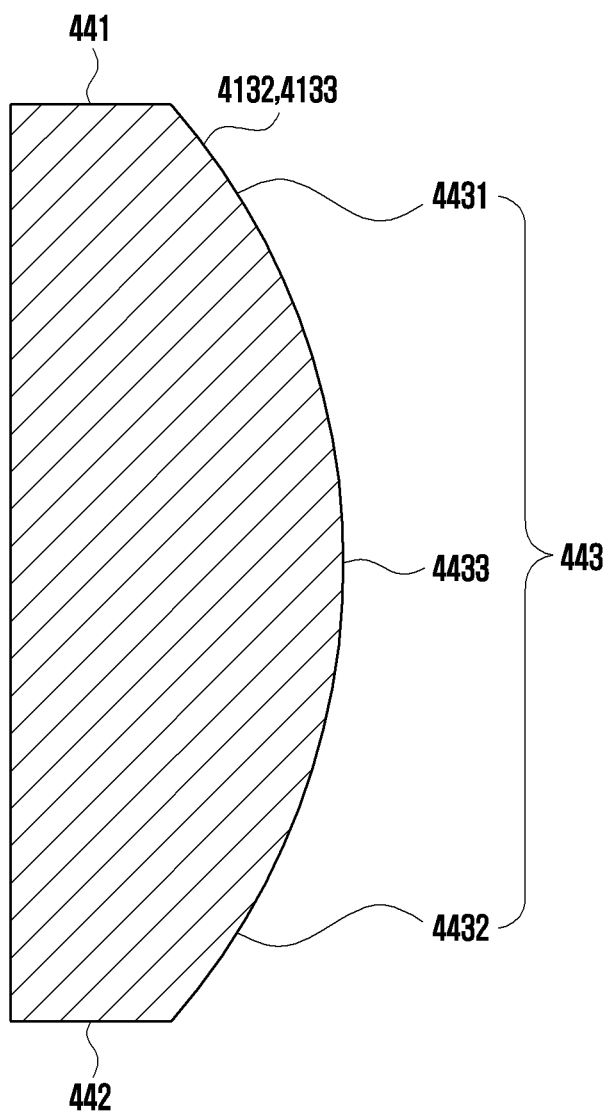

With reference to FIG. 7B, the third processed area 4433 may include a curved surface protruded outward so as to have a specific radius of curvature. According to an embodiment, the first processed area 4431 may be a curved surface connecting the third processed area 4433 and the first area 441, and the radius of the curved surface of the first processed area 4431 may be different from that of the third processed area 4433. According to an embodiment, the second processed area 4432 may also be a curved surface connecting the third processed area 4433 and the second area 442, and the radius of the curved surface of the second processed area 4432 may be the same as that of the first processed area 4431. In another embodiment, the first processed area 4431 and/or the second processed area 4432 may be curved surfaces having substantially the same radius of curvature as that of the third processed area 4433.

Figure 7C:
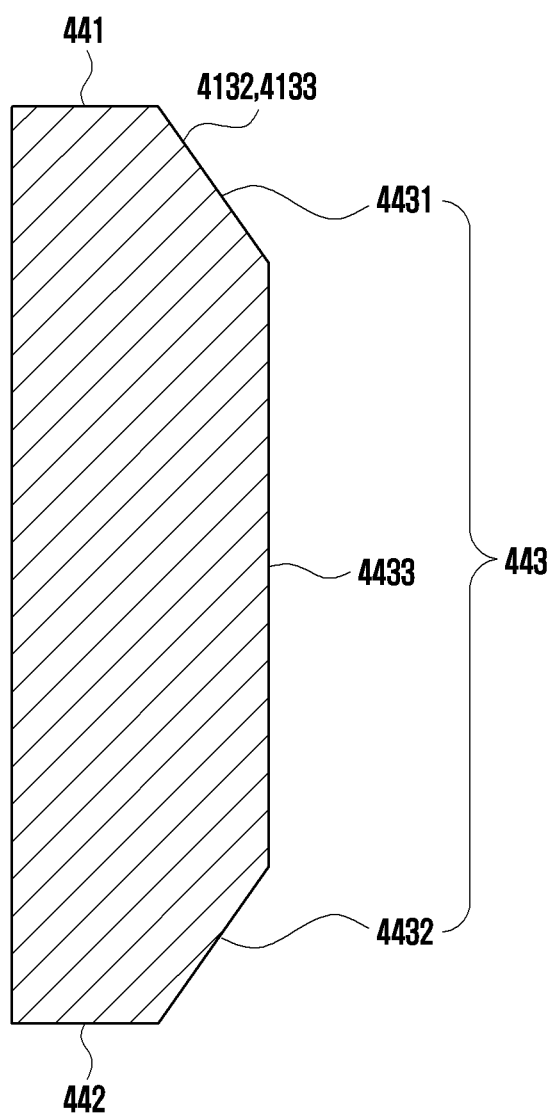

With reference to FIG. 7C, the third processed area 4433 may include a plane. According to an embodiment, the first processed area 4431 may be a plane connecting the third processed area 4433 and the first area 441. According to an embodiment, the second processed area 4432 may also be a plane connecting the third processed area 4433 and the second area 442. According to an embodiment, the slope of the plane of the third processed area 4433 and the slope of the plane of the first processed area 4431 may be different from each other. According to an embodiment, the slope of the plane of the third processed area 4433 and the slope of the plane of the second processed area 4432 may also be different from each other. According to an embodiment, the slope of the plane of the first processed area 4431 and the slope of the plane of the second processed area 4432 may be opposite to each other, and absolute values thereof may be substantially the same. The first processed area 4431 can be a first periphery portion. The second processed area 4432 can be a second periphery portion. The third processed area 4433 can be a wall portion.

Figure 7D:
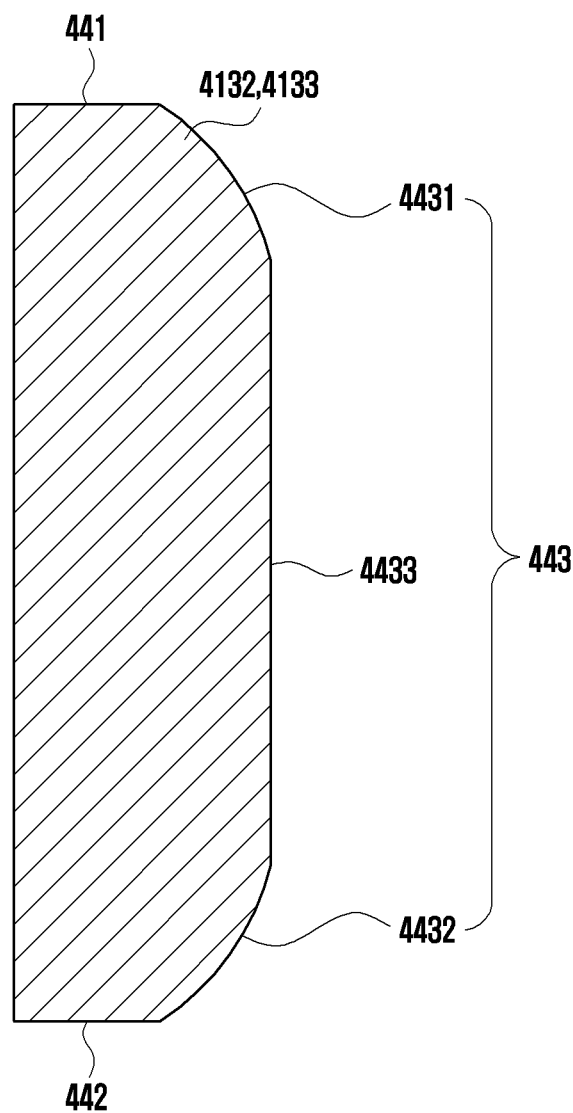

With reference to FIG. 7D, the third processed area 4433 may include a plane. According to an embodiment, the first processed area 4431 may be a curved surface connecting the third processed area 4433 and the first area 441. According to an embodiment, the second processed area 4432 may also be a curved surface connecting the third processed area 4433 and the second area 442. According to an embodiment, the radius of curvature of the curved surface of the first processed area 4431 and the radius of curvature of the curved surface of the second processed area 4432 may be substantially the same or may be different from each other.

Figure 7E:
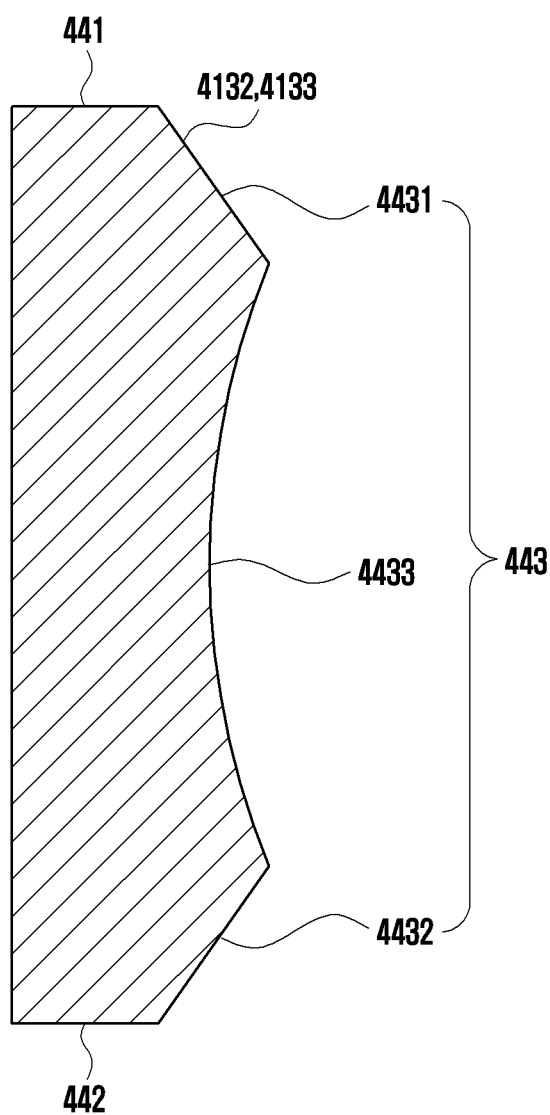

With reference to FIG. 7E, the third processed area 4433 may include a curved surface recessed toward the inside of the electronic device. According to an embodiment, the first processed area 4431 may be a plane connecting the third processed area 4433 and the first area 441. According to an embodiment, the second processed area 4432 may also be a plane connecting the third processed area 4433 and the second area 442. In another embodiment, the first processed area 4431 and the second processed area 4432 may be curved surfaces recessed inwardly or protruded outwardly. In this case, the radius of curvature of the curved surface of the first processed area 4431 and the radius of curvature of the curved surface of the second processed area 4432 may be substantially the same or may be different from each other.

Figure 8:
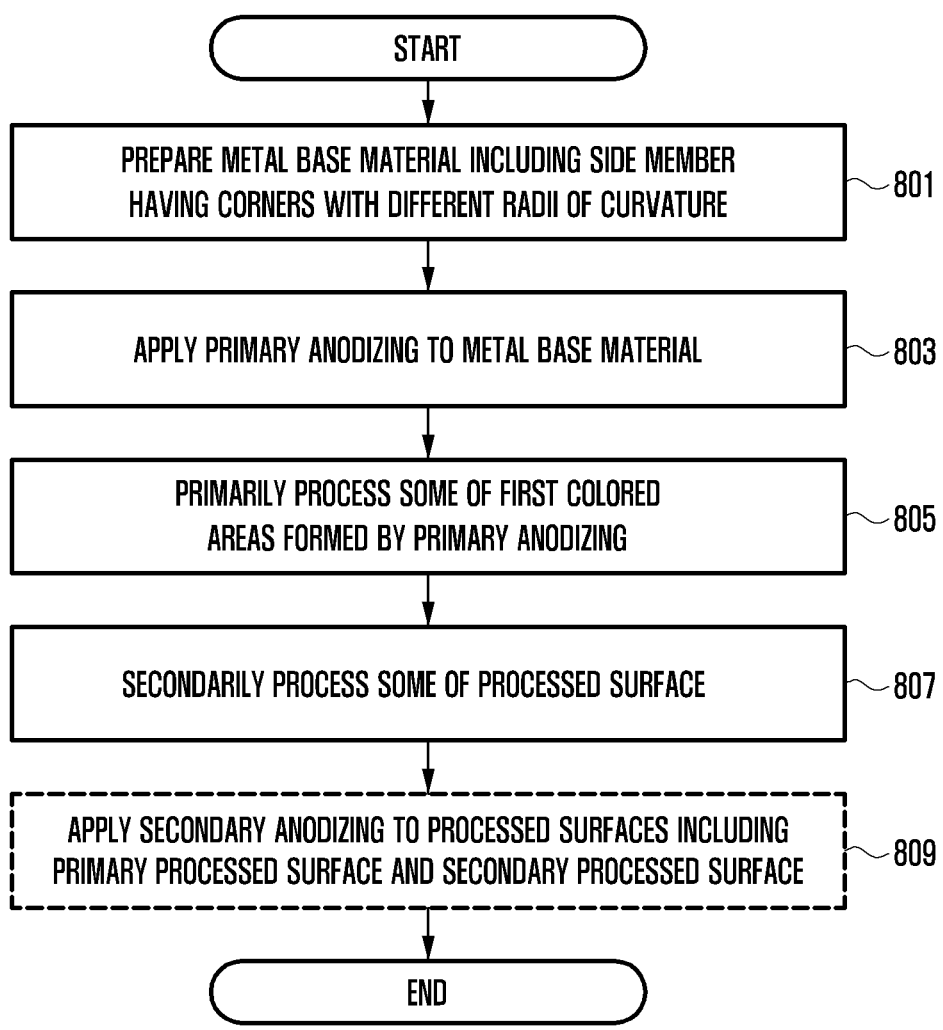
FIG. 8 is a process flowchart illustrating a method of producing a housing according to an embodiment of the disclosure.

FIG. 8 is a process flowchart illustrating a method of producing a housing according to an embodiment of the disclosure. FIGS. 9A to 9D are diagrams illustrating the producing method of FIG. 8 according to an embodiment of the disclosure.

Figure 9A:
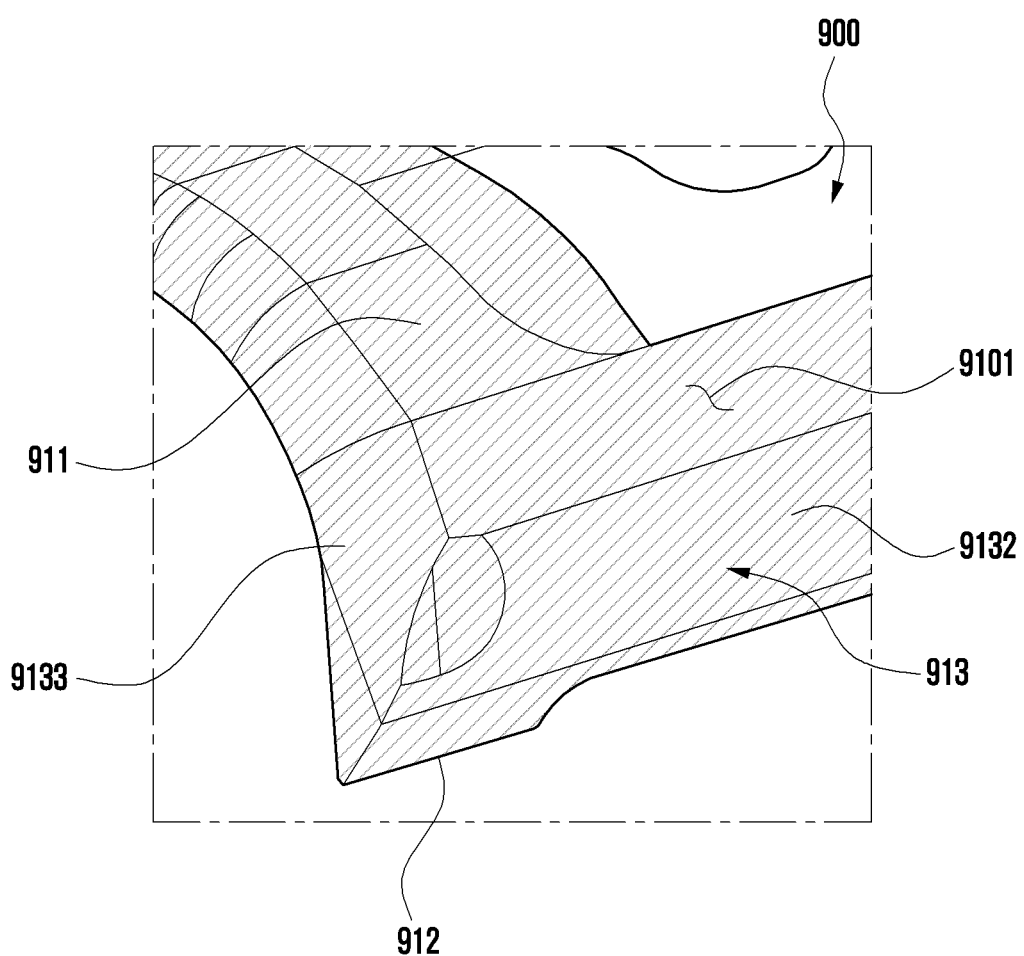
FIGS. 9A to 9D are diagrams illustrating the producing method of FIG. 8 according to an embodiment of the disclosure.
Figure 9B:
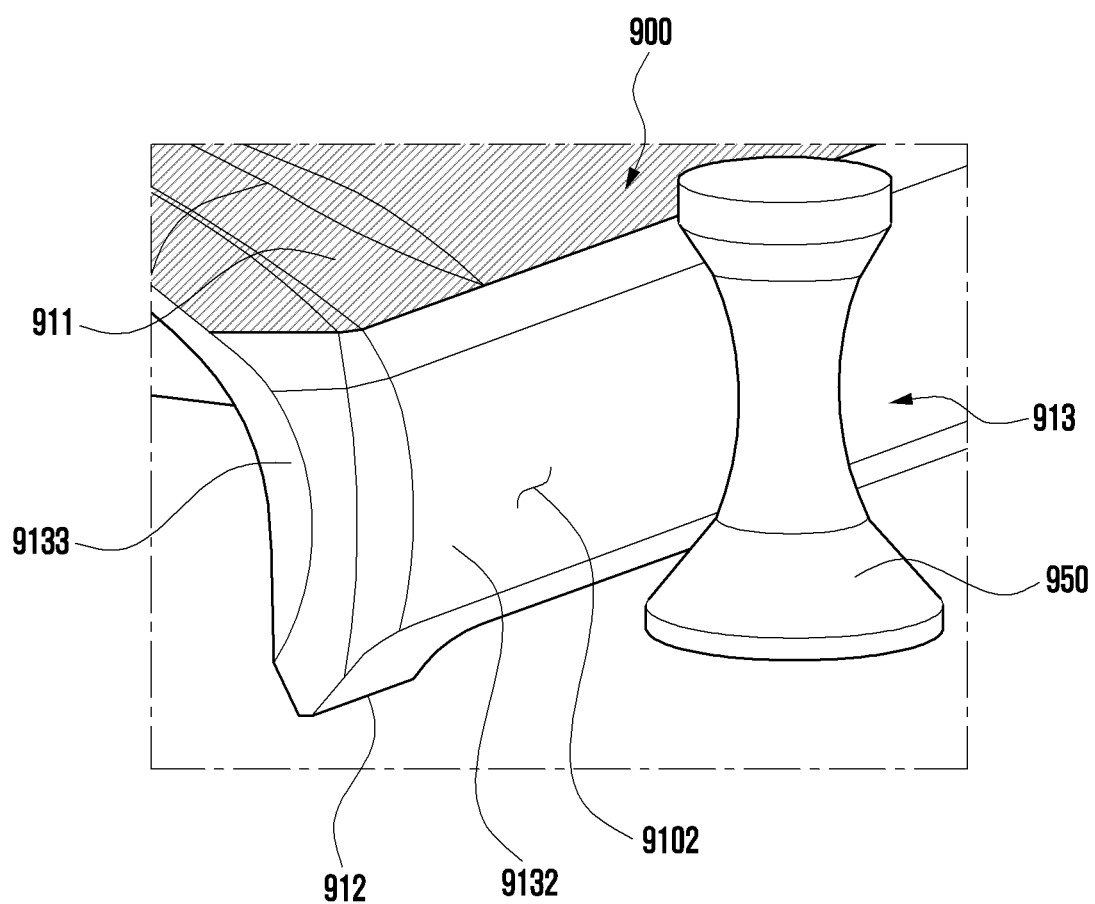
Figure 9C:
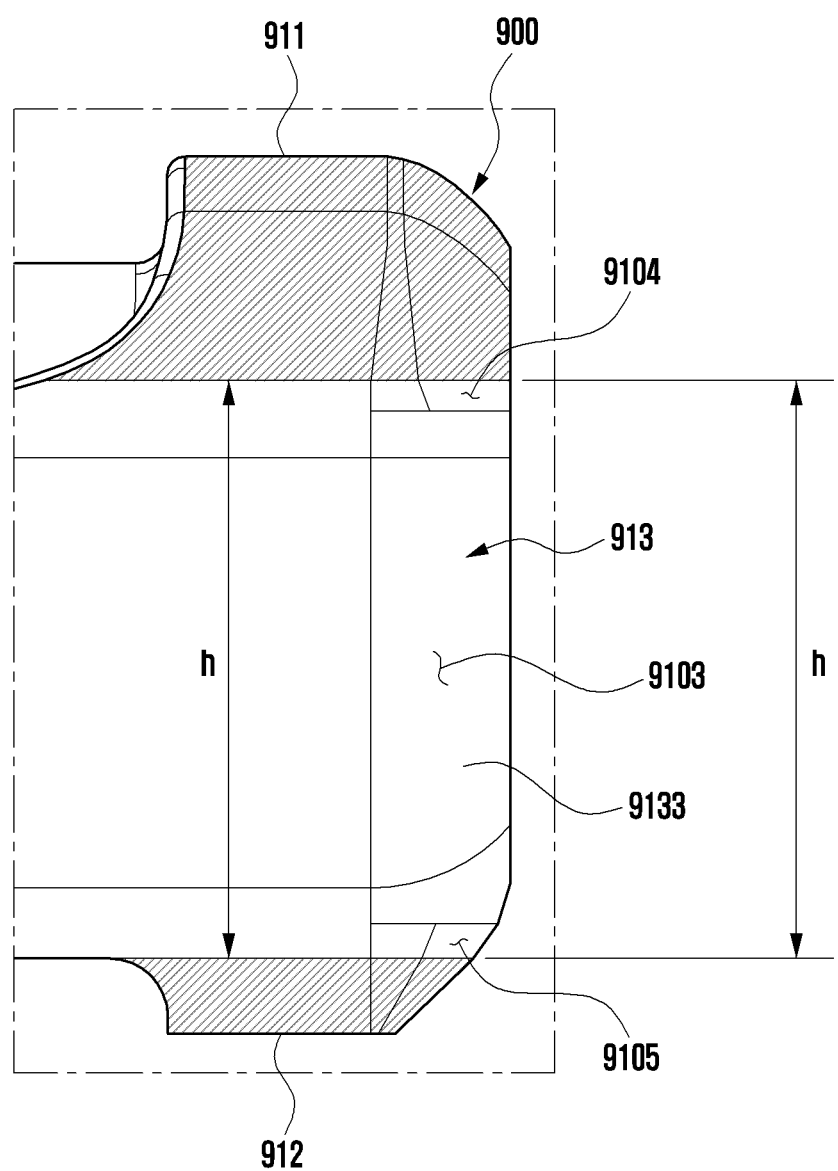
Figure 9D:
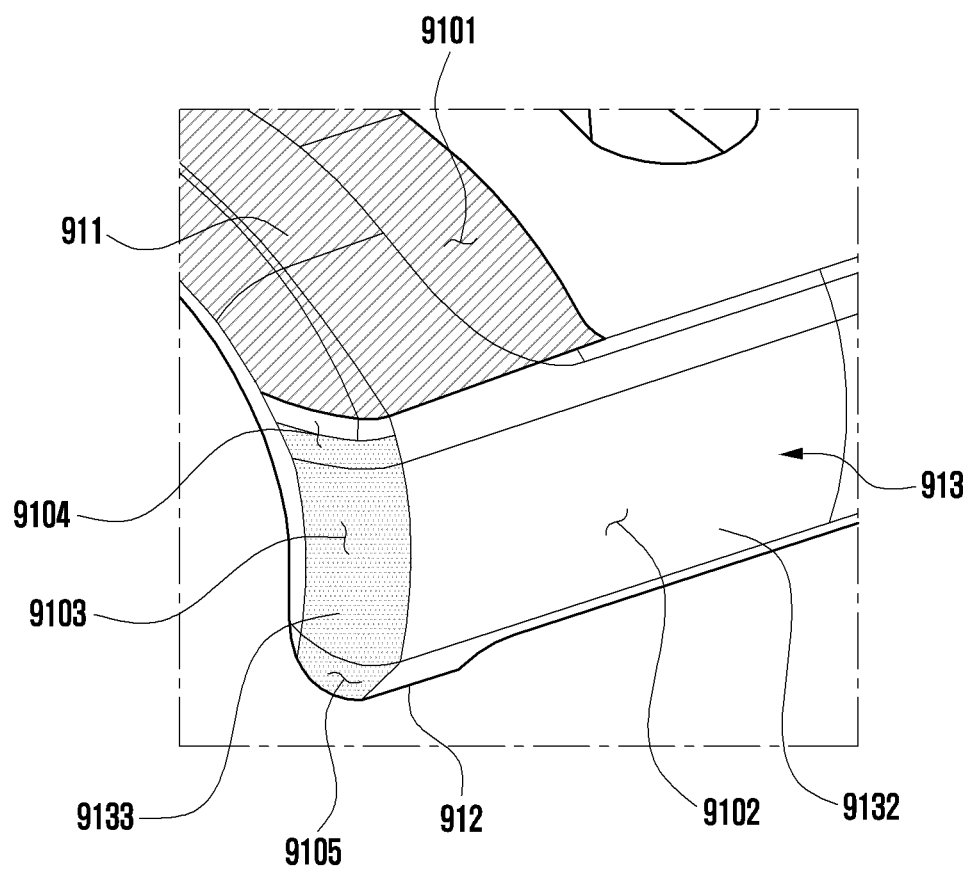

With reference to FIGS. 8 to 9D, in operation 801, a metal base material 900 (e.g., a housing including at least partially a conductive member) may include a side member 913 (e.g., the side member 413 of FIG. 5). The metal base material 900 may further have corners (e.g., the first corner C1 and the second corner C2 of FIG. 4) having different radii of curvature. According to one embodiment, as illustrated in FIG. 9A, the metal base material 900 may have substantially the same shape as that of the first housing 410 and/or the second housing 420 of FIG. 4 and include a first surface 911 (e.g., the first surface 411 of FIG. 5), a second surface 912 (e.g., the second surface 412 of FIG. 5) facing in a direction opposite to that of the first surface 911, and side surfaces 9132 and 9133 (e.g. the second side surface 4132 of FIG. 5 and the third side surface 4133 of FIG. 5) enclosing a space between the first surface 911 and the second surface 912. According to an embodiment, the side surfaces 9132 and 9133 be extended through a corner (e.g., the second corner C2 of FIG. 5) having a predetermined radius of curvature.

According to an embodiment, in operation 803, a primary anodizing process may be performed in the metal base material 900. According to an embodiment, as illustrated in FIG. 9A, the metal base material 900 may have a first colored area 9101 having a first color through a primary anodizing process. According to an embodiment, the first colored area 9101 may be formed on at least a portion of the first surface 911, the side surfaces 9132 and 9133, and at least a portion of the second surface 912.

According to an embodiment, in operation 805, some of the first colored area 9101 formed by primary anodizing may be primarily processed. According to one embodiment, as illustrated in FIG. 9B, the metal base material 900 may include a processed area 9102 formed by being cut using a forming tool 950 moving along the first side surface 9132 and the second side surface 9133. According to one embodiment, the processed area 9102 may be formed so that the metal base material 900 is exposed by the forming tool 950 peeling off the first colored area 9101. According to various embodiments, the processed area 9102 may be in various shapes depending on the shape of the forming tool 950, as illustrated in FIGS. 7A to 7D.

According to an embodiment, as illustrated in FIG. 9C, when the second side surface 9133 is processed by the forming tool 950 to obtain a shape corresponding to the processed area 9102 of the first side surface 9132, the second side surface 9133 may further include a processed area 9103 and additional processed areas 9104 and 9105 which are different from the processed area 9102 of the first side surface 9131. According to one embodiment, the additional processed areas 9104 and 9105 are for uniformly forming a line of the processed area extended from the first side surface 9132 to the second side surface 9133. And when the additional processed areas 9104 and 9105 are included with the other processed area 9103 of the second side surface 9133, the additional processed areas 9104 and 9105 may be disposed such that the distance between the outside edges of the additional processed areas 9104 and 9105 is the same as the same vertical distance of the processed area 9102 of the first side surface 9132. This additional processing line is formed because form processing is performed based on another corner (e.g., the first corner C1 of FIG. 4) having a radius of curvature (e.g., the first radius of curvature R1 of FIG. 4) larger than the radius of curvature (e.g., the second radius of curvature R2 of FIG. 4) of the corner (e.g., the second corner C2 of FIG. 4) connecting the first side surface 9132 and the second side surface 9133.

According to an embodiment, in operation 807, some of the processing surface may be secondarily processed. With reference to FIG. 9D, a non-cut processed area 9103 of the second side surface 9133 among the processed areas formed from the first side surface 9132 to the second side surface 9133 may be secondarily processed. For example, secondary processing may be performed by ball processing using a ball tool. In this case, while the processed area 9103 of the second side surface 9133 has the same processing line as the processed area 9102 of the first side surface 9132, the processed area 9103 of the second side surface 9133 may have the same shape as the processed area 9102 of the first side surface 9132 or may be formed in a curved surface having a different radius of curvature through secondary processing.

According to an embodiment, in operation 809, the processed area 9103 of the second side surface 9133 and the processed area 9102 of the first side surface 9132 in which secondary processing is complete may have a second color applied using secondary anodizing. According to one embodiment, the first color may be deeper or darker than the second color.

Figure 10:
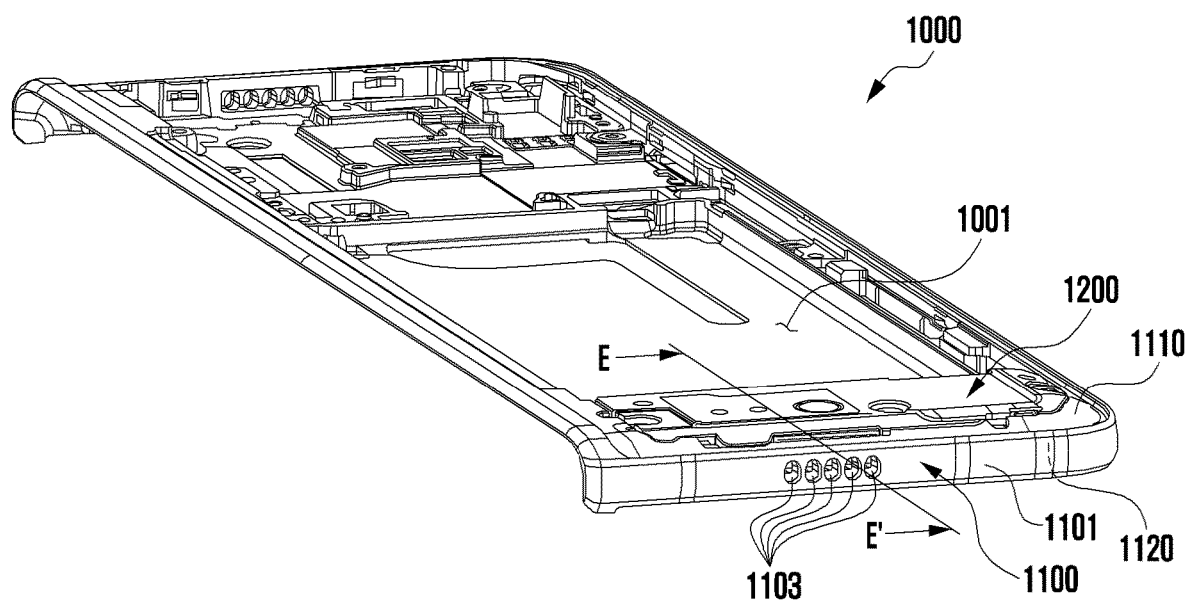
FIG. 10 is a perspective view illustrating a housing according to an embodiment of the disclosure.

FIG. 10 is a perspective view illustrating a housing 1000 according to an embodiment of the disclosure.

The housing 1000 of FIG. 10 may be at least partially similar to the first housing 110 or the second housing 120 of FIG. 1 or may further include additional components.

With reference to FIG. 10, the housing 1000 may include a front plate 1110 facing a first direction, a rear plate 1120 facing in a direction opposite to that of the front plate 1110, and a side member 1100 enclosing the inner space 1001 between the front plate 1110 and the rear plate 1120. According to an embodiment, the housing 1000 may include at least one first opening 1103 to enable fluidic communication between the inner space 1001 and the outside of the housing 1000. According to an embodiment, the housing 1000 may include an acoustic module assembly 1200 disposed in the inner space 1001 and configured to emit sounds to the outside or configured to record sounds received from the outside through the first opening 1103. According to an embodiment, the first opening 1103 may be referred to as a sound passage connected to the acoustic module assembly 1200.

Figure 11:
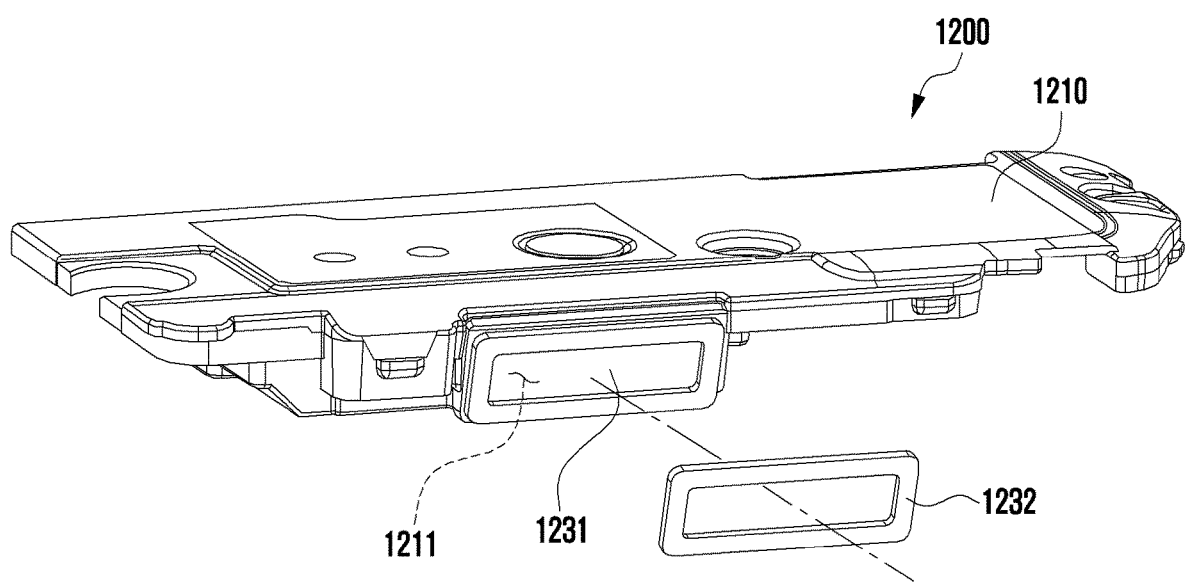
FIG. 11 is a perspective view illustrating an acoustic module assembly according to an embodiment of the disclosure.

FIG. 11 is a perspective view illustrating an acoustic module assembly 1200 according to an embodiment of the disclosure.

Figure 12:
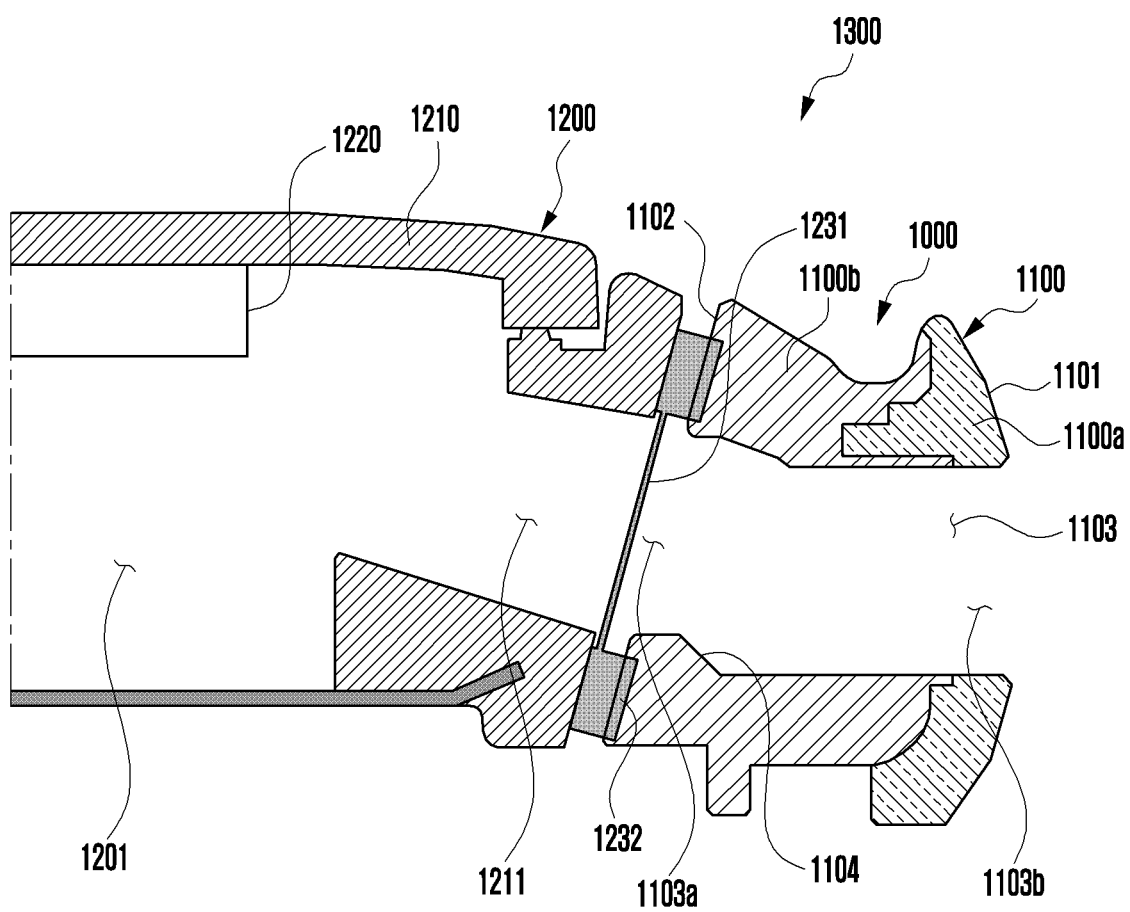
FIG. 12 is a partial cross-sectional view of an electronic device illustrating a state in which an acoustic module assembly is disposed in a housing according to an embodiment of the disclosure.

With reference to FIG. 11, the acoustic module assembly 1200 may include an acoustic module housing 1210 including at least one acoustic module (e.g., the acoustic module 1220 of FIG. 12). According to an embodiment, when the acoustic module housing 1210 is disposed in the inner space 1001 of the housing 1000, the acoustic module housing 1210 may include a second opening 1211 connected to the first opening 1103 when it is faced with the first opening 1103. According to one embodiment, the acoustic module housing 1210 may include a separating member 1231 shaped to enclose the second opening 1211 and an adhesive member 1232 disposed between the separating member 1231 and the opening 1103 of the housing 1000. According to one embodiment, the separating member 1231 may include a mesh for preventing penetration of external foreign materials or moisture. According to an embodiment, the adhesive member 1232 may include a double-sided tape and/or sealing rubber.

FIG. 12 is a partial cross-sectional view of an electronic device 1300 illustrating a state in which an acoustic module assembly 1200 is disposed in a housing 1000 according to an embodiment of the disclosure.

The electronic device 1300 of FIG. 12 may be at least partially similar to the electronic device 100 of FIG. 1 or the electronic device 400 of FIG. 4 or may include other components.

With reference to FIG. 12, the electronic device 1300 may include a housing 1000 and an acoustic module housing 1210 disposed in the inner space (e.g., the inner space 1001 of FIG. 10) of the housing 1000. According to one embodiment, the housing 1000 may include a side member 1100 made of various materials. For example, the side member 1100 may be formed by inserting a polymer portion 1100b into a conductive portion 1100a. The side member 1100 defines at least a portion of an external shape of the electronic device 1300.

According to an embodiment, the side member 1100 may include a first surface 1101 contacting the outside of the electronic device 1300 and a second surface 1102 facing in a direction opposite to that of the first surface 1101 and contacting an internal component of the electronic device 1300. According to an embodiment, the first opening 1103 may be extended from the first surface 1101 to the second surface 1102. According to an embodiment, the first opening 1103 may be formed at a position facing the second opening 1211 disposed in the inner space (e.g., the inner space 1001 of FIG. 10) of the housing 1000. According to an embodiment, the first opening 1103 may include a first space 1103a formed to face the second opening 1211 of the acoustic module housing 1210 on the second surface 1102 and a second space 1103b connected to the first space 1103a and formed on the first surface 1101 of the side member 1100. According to an embodiment, as the separation member 1231 and an adhesive member 1232 are interposed between the second surface 1102 and the acoustic module housing 1210, the second opening 1211 of the acoustic module housing 1210 and the first space 1103a of the first opening 1103 of the housing 1000 may be formed as a sound passage which is sealed from the outside. Therefore, the larger the adhesive area of the second surface 1102 contacting the adhesive member 1232, the better the seal.

According to an embodiment, in order to extend the adhesive area in the second surface 1102, as the first opening 1103 advances from the first space 1103a to the second space 1103b, the first opening 1103 may gradually increase in width. For example, in the first opening 1103, the second space 1103b may be wider than the first space 1103a, as implemented by a stepped portion 1104 formed in an area connecting the first space 1103a to the second space 1103b. According to an embodiment, the stepped portion 1104 may be an engraved structure disposed below the first space 1103a. According to one embodiment, the stepped portion 1104 may be tapered so that the lateral cross section of the opening becomes larger as it is advanced from the first space 1103a to the second space 1103b.

According to an embodiment, although the second opening 1211 is disposed to have eccentricity in the acoustic module housing 1210, the first opening 1103 gradually widens as it is advanced from the first space 1103a to the second space 1103b through the stepped portion 1104. Thus, natural sound transmission may be possible. Further, in the first opening 1103, sound may be amplified by the structure of the sound passage that is gradually widened as it is advanced from the second surface 1102 to the first surface 1101. Furthermore, because the second space 1103b formed at an outer surface of the first opening 1103 is not extended to the second surface 1102 through the extended first space 1103a, the adhesive area with the adhesive member 1232 is expanded to improve the reliability of the sealing structure.

Figure 13:
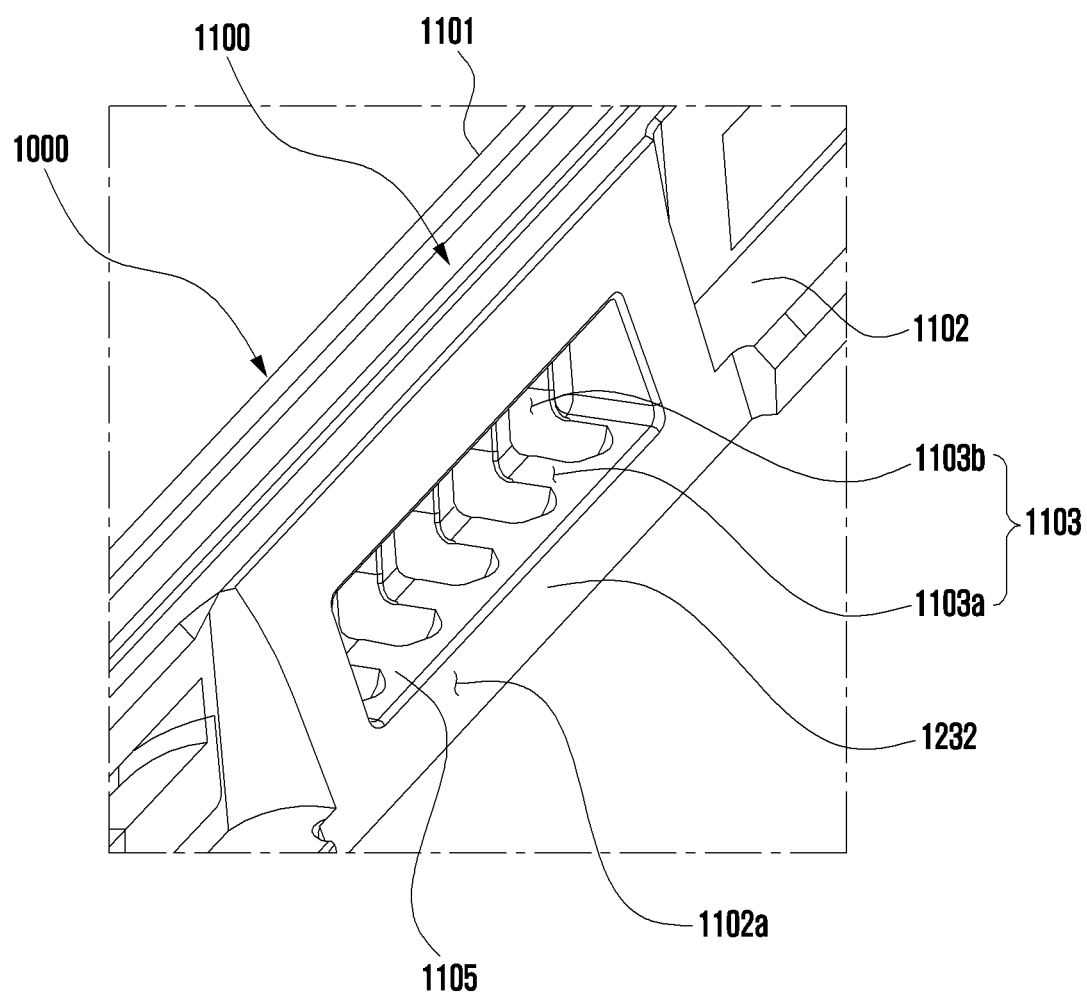
FIG. 13 and FIG. 14 are perspective views of a housing partially illustrating a shape of a first opening according to various embodiments of the disclosure.
Figure 14:
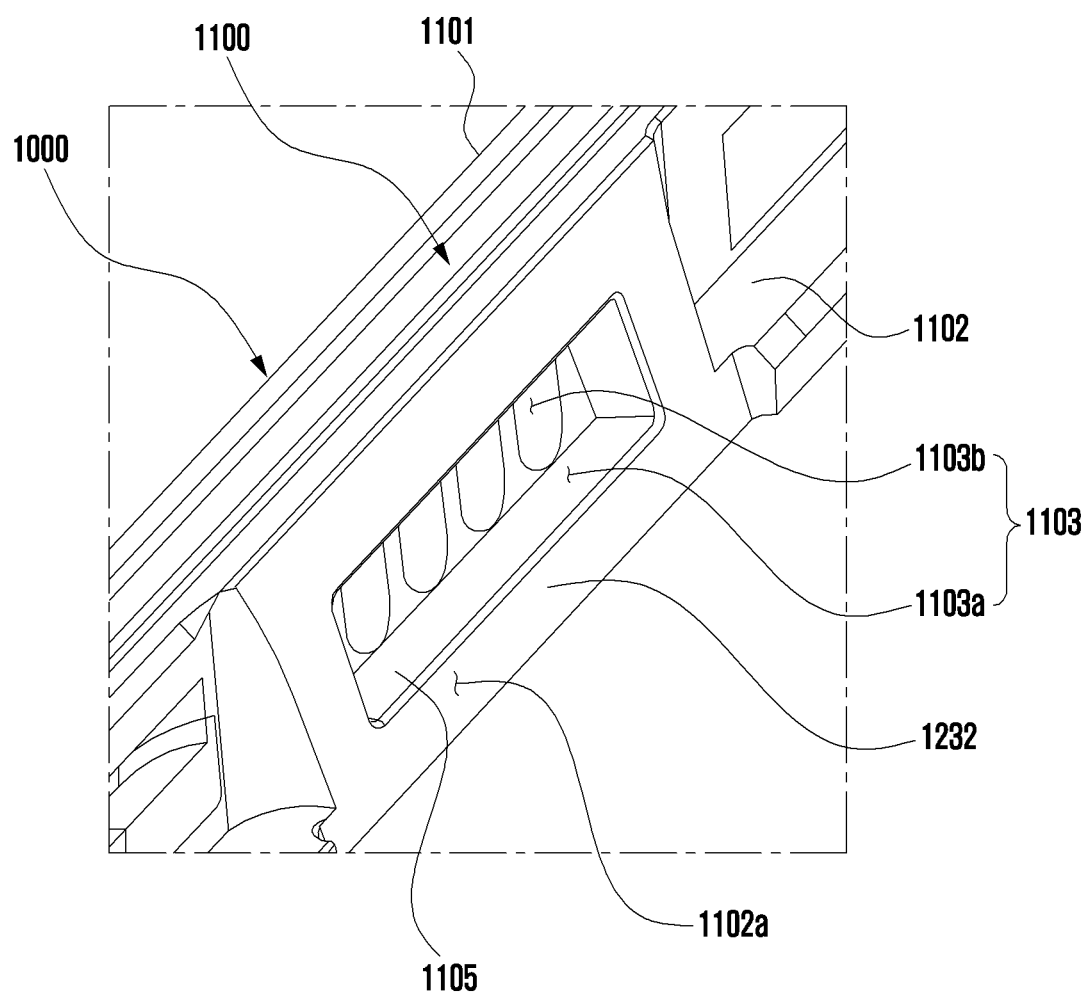

FIGS. 13 and 14 are perspective views of a housing 1000 partially illustrating a shape of a first opening 1103 according to various embodiments of the disclosure.

With reference to FIG. 13, the side member 1100 of the housing 1000 may include a first opening 1103 formed from the first surface 1101 to the second surface 1102 at a position facing a second opening (e.g., the second opening 1211 of FIG. 12) of an acoustic module housing (e.g., the acoustic module housing 1210 of FIG. 12). According to an embodiment, the first opening 1103 may include a first space 1103a and a second space 1103b having different lateral cross sections formed from the second surface 1102 to the first surface 1101. For example, because the second space 1103b is formed from the first space 1103a through a stepped portion (e.g., the stepped portion 1104 of FIG. 12) having an engraved structure, the adhesive area 1102a of the second surface 1102 may not be affected by the second space 1103b.

With reference to FIG. 14, the first opening 1103 may further include an extension surface 1105 disposed in the first space 1103a and extended to a portion in which the second space 1103b starts. In this configuration, even though a stepped portion is not provided at a portion in which the first space 1103a and the second space 1103b are connected through the extension surface 1105, the adhesive area 1102a formed at the second surface 1102 may not be affected by a shape of the second space 1103b.

According to certain embodiments of the disclosure, because processing lines of different side surfaces are aligned using a forming tool and post-processing is performed on at least one side surface within the processing line range, manufacture of the electronic device can be more easily performed and an enhanced external appearance can be obtained by the uniform processing line.

Further, by securing a relatively wide adhesive area between the acoustic module assembly and the housing, sound performance quality can be improved by more stable sealing.

According to an embodiment, the electronic device (e.g., the electronic device 400 of FIG. 4) may include a foldable housing including a hinge module (e.g., the hinge module 464 of FIG. 4); and a first housing (e.g., the first housing 410 of FIG. 4) connected to the hinge module and including a first surface (e.g., the first surface 411 of FIG. 4) facing in a first direction, a second surface (e.g., the second surface 412 of FIG. 4) facing in a direction opposite to the first direction, and a first side member (e.g., the first side member 413 of FIG. 4) enclosing a first space between the first surface and the second surface; and a second housing (e.g., the second housing 420 of FIG. 4) connected to the hinge module and including a third surface (e.g., the third surface 421 of FIG. 4) facing in a second direction, a fourth surface (e.g., the fourth surface 422 of FIG. 4) facing in a direction opposite to the second direction, and a second side member (e.g., the second side member 423 of FIG. 4) enclosing a second space between the third surface and the fourth surface, wherein the first housing and the second housing are foldably coupled to each other along the hinge module so as to at least partially face each other in a folded state, wherein the first side member includes a first side surface (e.g., the first side surface of FIG. 4) having a first length, a second side surface (e.g., the second side surface 4132 of FIG. 4) extended toward the hinge module through a first corner (e.g., the first corner C1 of FIG. 4) having a first radius of curvature (e.g., the first radius of curvature R1 of FIG. 4) from the first side surface and having a second length smaller than the first length, a third side surface (e.g., the third side surface 4133 of FIG. 4) extended to at least partially coincide with the hinge module through a second corner (e.g., the second corner C2 of FIG. 4) having a second radius of curvature (e.g., the second radius of curvature R2 of FIG. 4) smaller than the first radius of curvature from the second side surface, and a processed area (e.g., the processed area of FIG. 5) extended from the first side surface to the third side surface through the second side surface, wherein a vertical distance (e.g., the vertical distance h of FIG. 5) between a first boundary line (e.g., the first boundary line 444 of FIG. 5) between the processed area and the first surface and a second boundary line (e.g., the second boundary line 445 of FIG. 5) between the processed area and the second surface may be substantially equal across first side surface, the second side surface, and/or the third side surface.

According to an embodiment, a shape of the processed area of the first side surface may be substantially the same as a shape of the processed area of the second side surface.

According to an embodiment, the shape of the processed area of the second side surface may be different from that of the processed area of the third side surface.

According to an embodiment, the processed area may include a cutting area formed by processing a first colored area in at least a portion of the first surface, the side member, and/or at least a portion of the second surface, and wherein the first colored area has a first color formed using an anodizing process.

According to an embodiment, the first colored area may include at least a portion of the first side surface, the second side surface, and/or the third side surface.

According to an embodiment, the cutting area may include a second colored area in a second color different from the first color, the second color formed using another anodizing process.

According to an embodiment, the first color may be deeper or darker than the second color.

According to an embodiment, the processed area may include a first processed area (e.g., the first processed area 4431 of FIG. 5) extended from the first side surface to the third side surface through the second side surface, a second processed area (e.g., the second processed area 4432 of FIG. 5) extended from the first side surface to a third side surface through the second side surface and spaced apart from the first processed area, and a third processed area (e.g., the third processed area 4433 of FIG. 5) extended from the first side surface to the third side surface through the second side surface and disposed between the first processed area and the second processed area, wherein the first boundary line is between the first processed area and the first surface and the second boundary line is between the second processed area and the second surface.

According to an embodiment, the first processed area, the second processed area, and the third processed area may be curved surfaces each having different radii of curvature.

According to an embodiment, at least one of the first processed area, the second processed area, or the third processed area may be a planar surface or a curved surface.

According to an embodiment, a method of producing a housing may include forming a metal base material (e.g., the metal base material 900 of FIG. 9A) including side members having corners of different radii of curvature, forming a first colored area (e.g., the first colored area 9101 of FIG. 9A) in a first color formed using an anodizing process in the metal base material, forming a first processed area (e.g., the first processed area 9102 of FIG. 9B) by cutting at least a portion of the first colored area along a side surface including the corners of the side members, and forming a second processed area (e.g., the second processed area 9103 of FIG. 9C) by post-processing the first processed area formed at a side surface adjacent to a corner having a relatively small radius of curvature.

According to an embodiment, the method may include additionally processing the side surface in the processed area using a forming tool e.g., the forming tool 950 of FIG. 9B) when the at least one corner has a relatively large radius of curvature.

According to an embodiment, the second processed area may be processed to have a shape different from that of the first processed area.

According to an embodiment, the method may include forming a second colored area having a second color different from the first color formed using another anodizing process in the first processed area and the second processed area.

According to an embodiment, the first color may be deeper or darker than the second color.

According to an embodiment, the electronic device (e.g., the electronic device 100 of FIG. 1) may include a housing (e.g., the housing 1000 of FIG. 10) including a front plate (e.g., the front plate 1110 of FIG. 10), a rear plate (e.g., the rear plate 1120 of FIG. 10) facing in a direction opposite to that of the front plate, and a side member (e.g., the side member 1100 of FIG. 10) enclosing a space (e.g., the space 1001 of FIG. 10) between the front plate and the rear plate and including at least one first opening (e.g., the first opening 1103 of FIG. 10), an acoustic module assembly (e.g., the acoustic module assembly 1200 of FIG. 10) disposed to correspond to at least one first opening in the space. The acoustic module assembly may include an acoustic module housing (e.g., the acoustic module housing 1210 of FIG. 12) including an acoustic module (e.g., the acoustic module 1220 of FIG. 12); and a second opening (e.g., the second opening 1211 of FIG. 12) disposed between the acoustic module and the at least one first opening; and at least one adhesive member (e.g., the adhesive member 1232 of FIG. 12) disposed at an outer surface of the acoustic module housing and enclosing the second opening. The at least one first opening includes a first space (e.g., the first space 1103a of FIG. 12) connected to the second opening and a second space (e.g., the second space 1103b of FIG. 12) connected to the first space and having a lateral cross section larger than a lateral cross section of the first space, the lateral cross section of the first space being limited by a stepped portion of an engraved structure (e.g., the stepped portion 1104 of FIG. 12). The first space and the second space may form a sound conduit for the acoustic module.

According to an embodiment, a shape of the at least one first opening may be substantially the same as that of the lateral cross section of the second space.

According to an embodiment, an adhesive area between the side member and the acoustic module housing corresponds to the lateral cross section of the first space.

According to an embodiment, the electronic device may further include a separation member (e.g., the separation member 1231 of FIG. 12) disposed between the first opening and the second opening and configured to block inflow of external moisture or a foreign material traversed through the at least one adhesive member.

According to an embodiment, the electronic device may further include a display (e.g., the display 130 of FIG. 1) disposed in the space and exposed through at least a portion of the front plate.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Accordingly, all changes or modifications derived from the technical idea of various embodiments of the disclosure in addition to the embodiments described herein should be construed as being included in the scope of various embodiments of the disclosure without departing from the scope of the disclosure.

What is claimed is:

1. A portable communication device comprising:
a hinge module;
a first housing connected to the hinge module, the first housing including a first surface, a second surface opposite to the first surface, and a first side member forming a peripheral surface of the first housing; and
a second housing connected to the hinge module, the second housing including a third surface, a fourth surface opposite to the third surface, and a second side member forming a peripheral surface of the second housing;
wherein the first surface and the third surface face substantially a same direction when the portable communication device is unfolded, and face substantially one another when the portable communication device is folded; and
wherein the first side member includes:
a first side surface spaced apart from and substantially parallel with the hinge module;
a second side surface extended from the first side surface toward the hinge module such that a first ending portion of the second side surface adjacent to the first side surface forms at least part of a first curved corner having a first radius, and that a second ending portion of the second side surface adjacent to the hinge module forms at least part of a second curved corner having a second radius smaller than the first radius;
wherein a first periphery portion of the second side surface, including the at least part of the first curved corner and the at least part of the second curved corner, is adjacent to and angled with respect to a periphery portion of the first surface;
wherein a second periphery portion of the second side surface, including the at least part of the first curved corner and the at least part of the second curved corner, opposite to the first periphery portion is adjacent to and angled with respect to a periphery portion of the second surface;
wherein a wall portion of the second side surface between the first periphery portion and the second periphery portion is angled with respect to each of the first periphery portion and the second periphery portion;
wherein a height of the second side surface, including the first periphery portion, the second periphery portion and the wall portion, is substantially same throughout a substantially entire length of the second side surface including the at least part of the first curved corner and the at least part of the second curved corner, and
wherein the periphery portion of the first surface and the periphery portion of the second surface are formed in a first color, and
the first periphery portion of the second side surface, the second periphery portion of the second side surface, and the wall portion of the second side surface are formed in a second color different from the first color.

2. The portable communication device of claim 1, wherein the periphery portion of the first surface adjacent to the first periphery portion of the second side surface is inclined with respect to a planar portion of the first surface, or curved.

3. The portable communication device of claim 2, wherein the periphery portion of the second surface adjacent to the second periphery portion of the second side surface is inclined with respect to a planar portion of the second surface, or curved.

4. The portable communication device of claim 1, wherein the first color is deeper or darker than the second color.

5. The portable communication device of claim 1, wherein a slope of the wall portion is different from a slope of the first periphery portion or the second periphery portion.

6. The portable communication device of claim 3, wherein a curvature of the wall portion is different from a curvature of the first periphery portion or the second periphery portion.

7. The portable communication device of claim 3, wherein a shape of the wall portion is different from a shape of the first periphery portion or the second periphery portion.

8. The portable communication device of claim 1, wherein the first side member includes a third side surface extended from the first side surface toward the hinge module as substantially parallel with the second side surface such that a first ending portion of the third side surface adjacent to the first side surface forms at least part of a third curved corner having a third radius substantially same as the first radius, and that a second ending portion of the third side surface adjacent to the hinge module forms at least part of a fourth curved corner having a fourth radius substantially same as the second radius.

9. The portable communication device of claim 1, wherein the second side member includes:
- a third side surface spaced apart from and substantially parallel with the hinge module; and
- a fourth side surface extended from the third side surface toward the hinge module such that a third ending portion of the fourth side surface adjacent to the third side surface forms at least part of a third curved corner having a third radius, and that a fourth ending portion of the fourth side surface adjacent to the hinge module forms at least part of a fourth curved corner having a fourth radius smaller than the third radius.

10. The portable communication device of claim 1, wherein the first periphery portion, the second periphery portion, and the wall portion are planar.

\* \* \* \* \*